(12) United States Patent
Matsubara et al.

(10) Patent No.: US 8,591,378 B2
(45) Date of Patent: Nov. 26, 2013

(54) CONTROLLER FOR POWER TRANSMISSION SYSTEM

(75) Inventors: Tooru Matsubara, Toyota (JP); Atsushi Tabata, Okazaki (JP); Masakazu Kaifuku, Okazaki (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 1062 days.

(21) Appl. No.: 12/588,879

(22) Filed: Oct. 30, 2009

(65) Prior Publication Data

US 2010/0125021 A1    May 20, 2010

(30) Foreign Application Priority Data

Nov. 19, 2008 (JP) ................................ 2008-296081

(51) Int. Cl.
*B60K 1/02* (2006.01)

(52) U.S. Cl.
USPC .............................................. 477/3; 477/15

(58) Field of Classification Search
USPC .......................................................... 477/3, 15
See application file for complete search history.

(56) References Cited

U.S. PATENT DOCUMENTS

2007/0275818 A1* 11/2007 Kouno .............................. 477/3
2008/0318727 A1* 12/2008 Matsubara et al. ................ 477/3

FOREIGN PATENT DOCUMENTS

| JP | A-2006-213149 | 8/2006 |
| JP | A-2007-118697 | 5/2007 |
| JP | A-2008-137619 | 6/2008 |
| JP | A-2008-179242 | 8/2008 |
| JP | A-2008-201229 | 9/2008 |
| JP | A-2008-213686 | 9/2008 |

OTHER PUBLICATIONS

Nov. 24, 2009 Office Action issued in Japanese Patent Application No. 2008-296081 (w/ translation).

* cited by examiner

*Primary Examiner* — Derek D Knight
(74) *Attorney, Agent, or Firm* — Oliff & Berridge, PLC

(57) ABSTRACT

A controller for a power transmission system that uses an engine and a motor as driving force sources to transmit power and that includes a transmission unit is provided. The transmission unit has a plurality of engagement devices and establishes a plurality of gears having different speed ratios by the frictional engagement devices. The transmission unit is arranged downstream of the driving force sources. The controller includes a torque transmission capacity setting unit that, when the transmission unit shifts gears, varies torque transmission capacities of the frictional engagement devices on the basis of an operating state of the motor and an operating state of the engine.

9 Claims, 9 Drawing Sheets

| | C1 | C2 | B1 | B2 | B3 | GEAR RATIO | STEP |
|---|---|---|---|---|---|---|---|
| 1st | O | | | | O | 3.357 | |
| | | | | | | | 1.54 |
| 2nd | O | | | O | | 2.180 | |
| | | | | | | | 1.53 |
| 3rd | O | | O | | | 1.424 | |
| | | | | | | | 1.42 |
| 4th | O | O | | | | 1.000 | |
| R | | O | | | O | 3.209 | TOTAL 3.36 |
| N | | | | | | | |

O ENGAGED

CONTROLLER FOR POWER TRANSMISSION SYSTEM

INCORPORATION BY REFERENCE

The disclosure of Japanese Patent Application No. 2008-296081 filed on Nov. 19, 2008 including the specification, drawings and abstract is incorporated herein by reference in its entirety.

BACKGROUND OF THE INVENTION

1. Field of the Invention

The invention relates to a power transmission system that includes an engine and a motor as driving force sources and also includes a transmission unit downstream of the driving force sources and, more particularly, to a technique for appropriately carrying out shift control over the transmission unit irrespective of an operating state of the driving force sources.

2. Description of the Related Art

There is known a power transmission system that includes an engine and a motor as driving force sources and that further includes a transmission unit arranged downstream of the driving force sources. The transmission unit establishes a plurality of gears having different speed ratios by frictional engagement devices. Japanese Patent Application Publication No. 2006-213149 (JP-A-2006-213149) describes a vehicle power transmission system, which is an example of the above power transmission system. The vehicle power transmission system includes (a) an engine, (b) an electric differential unit that includes a differential mechanism, having a differential input member and a differential output member, and a rotary machine, coupled to a rotating element of the differential mechanism so as to be able to transmit power, and that allows controlling a differential state between the rotational speed of the differential input member coupled to the engine and the rotational speed of the differential output member by controlling an operating state of the rotary machine, (c) a motor that is arranged so as to be able to transmit power to the differential output member of the electric differential unit, and (d) a transmission unit that is arranged between the differential output member and drive wheels. Then, in the above hybrid vehicle power transmission system, generally, a motor drive mode is established in an operating region in which engine efficiency is poor, such as a low vehicle speed region and a low output region, while an engine drive mode or an engine and motor drive mode is established in an operating region in which engine efficiency is good, such as intermediate and high vehicle speed regions and intermediate and high output regions. In the motor drive mode, the engine is stopped and only the motor is used to drive the vehicle. In the engine drive mode, the engine is started and only the engine is used to drive the vehicle. In the engine and motor drive mode, the engine and the motor are used to drive the vehicle. In addition, in the motor drive region in which only the motor is used to drive the vehicle, the engine is started as needed in order to charge a battery, carry out warm-up, or the like.

On the other hand, when the transmission unit shifts gears, the magnitude of torque transmission capacity (hydraulic pressure, or the like) and control pattern of the frictional engagement devices are determined in accordance with an input torque and a type of a shift (upshift, downshift, or the like). However, if start or stop of the engine overlaps a shift of the transmission unit, shift shock easily occurs. For example, when the motor drive mode is switched over to the engine drive mode or the engine and motor drive mode, the engine is driven for rotation (cranked) by the rotary machine, and reaction force is received by the motor. This suppresses fluctuations in driving force while making it possible to start the engine. When such start of the engine overlaps a shift of the transmission unit, there is a case where the timing of torque transmission capacity control of the frictional engagement devices with respect to the rising of input torque attended with start of the engine (start of operation of the engine) deviates and, as a result, shift shock occurs. Therefore, in JP-A-2006-213149, when start or stop of the engine overlaps a shift of the transmission unit, any one of the operations is carried out first, and the other operation is carried out next.

However, if any one of the operations is carried out first and the other operation is carried out next when start or stop of the engine overlaps a shift of the transmission unit, there is a problem that the response to a change in driving force required by the driver is poor.

SUMMARY OF THE INVENTION

The invention provides a controller for a power transmission system, which appropriately shifts a transmission unit irrespective of a change in operating states of a motor and engine even when the change in operating states of the motor and engine overlaps a shift of the transmission unit to suppress shift shock while making it possible to immediately obtain a desired required driving force.

A first aspect of the invention provides a controller for a power transmission system that uses an engine and a motor as driving force sources to transmit power. The power transmission system includes a transmission unit that has a plurality of engagement devices, that establishes a plurality of gears having different speed ratios by the engagement devices and that is arranged downstream of the driving force sources. The controller includes a torque transmission capacity setting unit that, when the transmission unit shifts gears, varies torque transmission capacities of the engagement devices on the basis of an operating state of the motor and an operating state of the engine.

With the above controller for the power transmission system, when the transmission unit shifts gears, the torque transmission capacities of the engagement devices are varied on the basis of the operating state of the motor and the operating state of the engine. Thus, for example, the torque transmission capacities are set in advance by predicting a variation in input torque on the basis of the operating state of the motor and the operating state of the engine. By so doing, even when changes in the operating states of the motor and engine overlap a shift of the transmission unit, it is possible to constantly appropriately execute shift control (torque transmission capacity control) over the transmission unit irrespective of the changes in the operating states of the motor and engine and a delay of response of torque transmission capacity control. Therefore, it is possible to immediately obtain a desired required driving force while suppressing shift shock.

In addition, in the controller for a power transmission system, when the engine is started at the time of a downshift of the transmission unit during a motor drive mode in which only the motor is used as the driving force source, the torque transmission capacity setting unit may decrease the torque transmission capacity of a release-side frictional engagement device among the plurality of engagement devices of the transmission unit and may increase the torque transmission capacity of an engage-side frictional engagement device among the plurality of engagement devices of the transmission unit, as compared with when the engine is already in operation.

The thus configured controller is a specific example of a case where torque transmission capacities are set in advance by predicting a variation in input torque on the basis of the operating states of the motor and engine, and relates to a vehicle power transmission system. When the engine is started at the time of a downshift of the transmission unit during the motor drive mode in which only the motor is used as the driving force source, the torque transmission capacity of the release-side frictional engagement device is decreased, and the torque transmission capacity of the engage-side frictional engagement device is increased, as compared with when the engine is already in operation. Thus, even when a period of time from when the engine is started to operate (rotate by itself) to when the input torque increases is long, the input-side rotational speed is immediately increased by the torque of the motor to promptly advance the shift, while the engage-side torque transmission capacity is increased to make it possible to appropriately prevent racing of the input-side rotational speed after the engine starts operation. In addition, when the engine is already in operation, the input torque is immediately increased. Then, the torque transmission capacity of the release-side frictional engagement device is high, so it is possible to gradually increase the input torque while suppressing racing of the input-side rotational speed. In addition, the torque transmission capacity of the engage-side frictional engagement device having a relatively low torque transmission capacity is increased at the time when reaching around the synchronous rotational speed of the post-shift gear to engage the engage-side frictional engagement device. Thus, it is possible to appropriately shift gears. That is, the start timing of the engine and, in addition, the timing of rising of the input torque vary between when the engine is already in operation and when the engine is in start control, so there is a possibility that the same torque transmission capacity control may cause extension of shift time or shift shock due to racing, or the like. However, in the aspect of the invention, the torque transmission capacities are varied during operation of the engine and during start control of the engine, so shift control is appropriately performed while suppressing shift shock to immediately obtain a desired required driving force.

In addition, in the controller for a power transmission system, the torque transmission capacity setting unit may output an instruction for increasing the torque transmission capacity of the release-side frictional engagement device at a time earlier than a time at which input torque is estimated to increase due to start of operation of the engine, by a predetermined period of time.

With the above controller, an instruction for increasing the torque transmission capacity of the release-side frictional engagement device may be output at a time earlier than a time at which input torque is estimated to increase due to start of operation (rotation by itself) of the engine, by a predetermined period of time. Thus, irrespective of a steep increase in input torque and a delay of response of torque transmission capacity control, it is possible to appropriately prevent racing of the input-side rotational speed.

In addition, in the controller for a power transmission system, when the engine is started at the time of a downshift of the transmission unit during the motor drive mode in which only the motor is used as the driving force source, the torque transmission capacity setting unit may increase the torque transmission capacity of the release-side frictional engagement device of the transmission unit, as compared with when the engine is not started.

The thus configured controller is a specific example of a case where torque transmission capacities are set in advance by predicting a variation in input torque on the basis of the operating states of the motor and engine, and relates to a vehicle power transmission system. When the engine is started at the time of a downshift of the transmission unit during the motor drive mode in which only the motor is used as the driving force source, the torque transmission capacity of the release-side frictional engagement device of the transmission unit is increased, as compared with when the engine is not started. Thus, it is possible to appropriately prevent racing of the input-side rotational speed when the input torque increases as the engine is started to operate. In addition, when the engine is not started, the rotational speed of the motor increases because of an increase in input-side rotational speed attended with the shift, and the torque of the motor decreases to decrease the input torque in equal power shift. However, the release-side torque transmission capacity is low, the input-side rotational speed is immediately increased by the input torque (torque of the motor), and then the shift is promptly carried out.

In addition, the controller for a power transmission system may further include an engine state determination unit that determines the operating state of the engine at the time when a shift instruction for shifting the transmission unit is output or at the time when an inertia phase of the shift starts.

With the above controller, the operating state of the engine is determined at the time when a shift instruction for shifting the transmission unit is output or at the time when an inertia phase of the shift starts. Thus, when the operating state of the engine is determined at the time when a shift instruction for shifting gears is output, it is possible to appropriately control the torque transmission capacities by predicting a variation in input torque in advance on the basis of the operating state of the engine from the beginning of shift control. In addition, when the operating state of the engine is determined at the time when an inertia phase starts, for example, even when engine start control is started after a shift instruction is output, the torque transmission capacities are controlled by predicting a variation in input torque on the basis of the operating state of the engine, thus making it possible to appropriately execute shift control.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figures 1, 2:
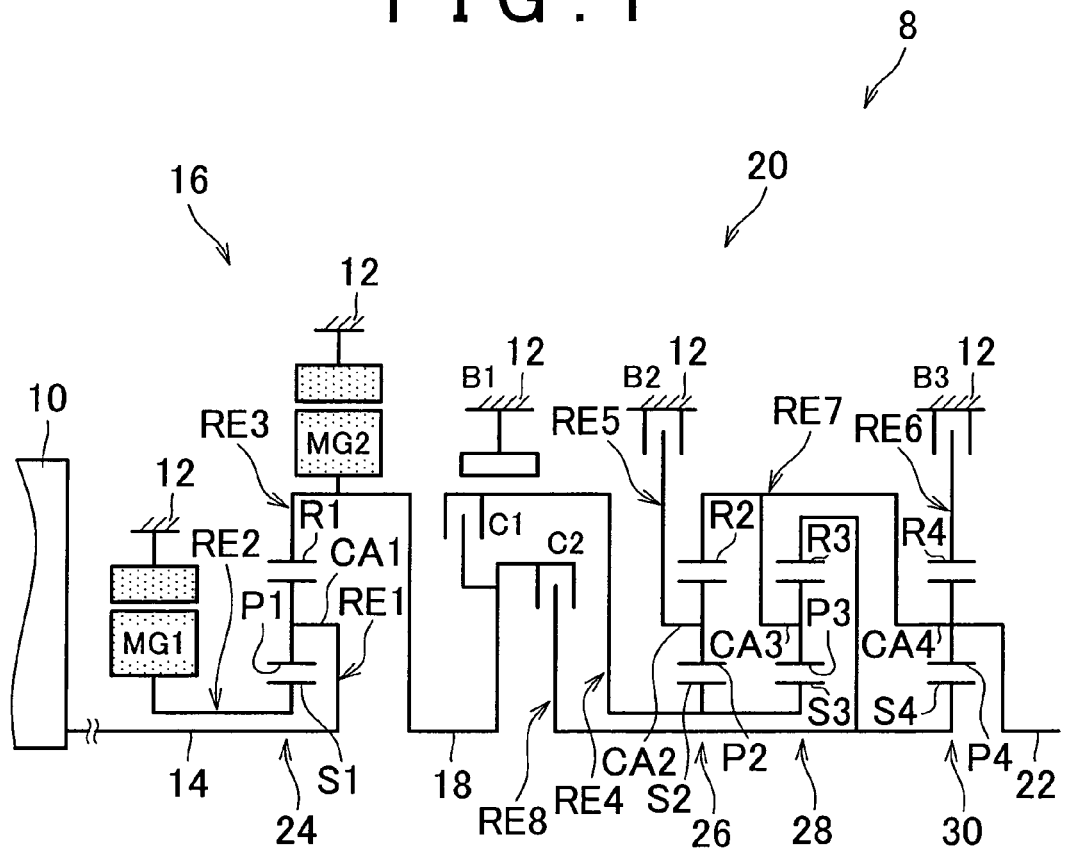
FIG. 1 is a skeleton diagram that illustrates a power transmission system for a hybrid vehicle according to an embodiment of the invention.
FIG. 2 is an operation table that illustrates the relationship between a plurality of gears of an automatic transmission unit equipped for the power transmission system shown in FIG. 1 and frictional engagement devices for establishing the gears.

An aspect of the invention may be suitably applied to a hybrid power transmission system that, for example, includes (a) an engine, (b) an electric differential unit that includes a differential mechanism, having a differential input member and a differential output member, and a rotary machine, coupled to a rotating element of the differential mechanism so as to be able to transmit power, and that allows controlling a differential state between the rotational speed of the differential input member coupled to the engine and the rotational speed of the differential output member by controlling an operating state of the rotary machine, (c) a motor that is arranged so as to be able to transmit power to the differential output member of the electric differential unit, and (d) a transmission unit that is arranged between the differential output member and drive wheels and that establishes a plurality of gears having different speed ratios by frictional engagement devices. The aspect of the invention may be applied to various hybrid power transmission systems that at least include an engine and a motor as driving force sources and also include a transmission unit downstream of the driving force sources. A single pinion type or double pinion type planetary gear set is suitably used as the differential mechanism. Instead, another differential mechanism, such as a bevel gear type planetary gear set, may also be employed. The rotary machine corresponds to an electric rotating machine (JIS-Z9212). The rotary machine is a motor generator that is able to selectively use the function of an electric motor, a generator or both. The motor is an electric motor or a motor generator.

The transmission unit is, for example, a planetary gear type or parallel axis type stepped transmission. The transmission unit establishes a plurality of gears in such a manner that the plurality of frictional engagement devices are engaged or released. The transmission unit is suitably applied to clutch-to-clutch shift in which shift is performed by engaging one of a pair of frictional engagement devices while releasing the other one of the pair of frictional engagement devices. In addition, the transmission unit may also be applied to a case where a one-way clutch is provided and then shift is performed by engaging or releasing a single frictional engagement device. In addition, the transmission unit may be an automatic transmission that automatically shifts gears on the basis of a vehicle speed and a required driving force (accelerator operation amount, or the like). The transmission unit may also be applied to a manual shift that electrically shifts gears in accordance with driver's manual operation. A hydraulic frictional engagement device is widely used as the frictional engagement device. In the hydraulic frictional engagement device, torque transmission capacity is controlled by hydraulic pressure. Thus, the torque transmission capacity corresponds to hydraulic pressure. Instead, another frictional engagement device, such as an electromagnetic clutch, that is able to control torque transmission capacity may also be used.

The aspect of the invention, for example, includes (a) an engine state determination unit that, when the transmission unit shifts gears in the motor drive mode in which only the motor is used as the driving force source, determines whether the engine is stopped, in operation or in engine start control as the operating state of the engine; (b) a shift-time torque transmission capacity setting unit (a shift hydraulic pressure setting unit, for example, in the case of the hydraulic frictional engagement devices) that varies the torque transmission capacities of the frictional engagement devices on the basis of the operating state of the engine, determined by the engine state determination unit. The engine state determination unit is configured to determine the operating state of the engine, for example, at the time when a shift instruction for shifting the transmission unit is output or at the time when an inertia phase starts. Instead, the engine state determination unit may be configured to determine the operating state of the engine at all times to vary the torque transmission capacities in real time. During engine start control, it is also desirable to vary the torque transmission capacities in shift control depending on the progress of the start control. The progress of shift control may be determined from, for example, engine rotational speed, elapsed time from the beginning of engine start control, or the like.

The shift-time torque transmission capacity setting unit is, for example, configured to vary the torque transmission capacities on the basis of the operating state of the engine. Instead, the shift-time torque transmission capacity setting unit may be configured to vary not only the magnitudes of the torque transmission capacities but also increase/decrease start timing, rate of change, or the like, at the time when the torque transmission capacities are increased or decreased. It is desirable that, for example, when the operating state of the engine is determined at a predetermined timing and then the torque transmission capacities are varied on the basis of the determined operating state, the shift-time torque transmission capacity setting unit executes shift control (torque transmission capacity control) in accordance with a predetermined control pattern on the basis of the once determined torque transmission capacities even when the operating state of the engine changes thereafter in terms of preventing a delay of response of the torque transmission capacity control.

In addition, the shift-time torque transmission capacity setting unit is configured to predict an increase in input torque due to a start of operation of the engine and output an instruction for increasing the torque transmission capacity of the release-side frictional engagement device a predetermined period of time before the predicted increase in input torque. As an equal power shift in which shift is performed in a state where the output of the motor is constant, such as when in the motor drive mode in which the engine is not started and the motor is set at an allowable maximum power at the time when a driving force that exceeds a battery capacity is required, the torque of the motor decreases with an increase in motor rotational speed attended with a downshift and, furthermore, the input torque decreases. Thus, when the torque transmission capacities in consideration of the decrease in torque are predetermined, it is possible to prevent a delay of response of the torque transmission capacity control to a decrease in input torque.

The aspect of the invention may be applied not only to the torque transmission capacity control during downshifting but also to torque transmission capacity control during upshifting. For example, when the engine is started at the time of an upshift of the transmission unit during the motor drive mode in which only the motor is used as the driving force source, the torque transmission capacity of the engage-side frictional engagement device of the transmission unit is decreased in comparison with the case where the engine is already in operation, and the torque transmission capacity of the engage-side frictional engagement device of the transmission unit is increased in comparison with the case where the engine is not started. That is, during upshifting, it is necessary to release the release-side frictional engagement device while decreasing the input-side rotational speed for engaging the engage-side frictional engagement device. However, when the engine is already in operation, input torque increases in a short period of time, so it is necessary to relatively increase the torque transmission capacity of the engage-side frictional engagement device in order to decrease the input-side rotational speed while preventing racing. When the engine is not started, it is possible to increase the input-side rotational speed while preventing racing even when the torque transmission capacity of the engage-side frictional engagement device is relatively low. When the engine is started, the intermediate torque transmission capacity is set to decrease the input-side rotational speed while preventing racing at the time of an engine start. In addition, by increasing the torque transmission capacity of the engage-side frictional engagement device a predetermined period of time before a predicted increase in input torque due to start of operation of the engine occurs, it is possible to appropriately prevent racing of the input-side rotational speed due to an increase in input torque irrespective of a delay of response of the torque transmission capacity control.

In addition, in the aspect of the invention, the torque transmission capacity is varied on the basis of the operating state of the engine at the time of a downshift of the transmission unit during the motor drive mode. Instead, the aspect of the invention may also be applied to a case where the torque transmission capacity is varied on the basis of the operating states of the engine and motor at the time of a shift of the transmission unit when the engine drive mode is switched over to the motor drive mode. Thus, the aspect of the invention may be implemented in various forms.

Hereinafter, an embodiment of the invention will be described in detail with reference to the accompanying drawings. FIG. 1 is skeleton diagram that illustrates a power transmission system 8 for a hybrid vehicle according to the embodiment of the invention. As shown in FIG. 1, the power transmission system 8 includes an input shaft 14, an electric differential unit 16, an automatic transmission unit 20 and an output shaft 22, which are coaxially arranged in series with one another in a transmission case 12 (hereinafter, referred to as a case 12). The case 12 serves as a non-rotating member and is secured to a vehicle body. The input shaft 14 serves as a differential input member. The electric differential unit 16 serves as a continuously variable transmission unit and is coupled to the input shaft 14. The automatic transmission 20 is serially coupled in a power transmission path between electric differential unit 16 and drive wheels 34 (see FIG. 7) via a power transmission member 18. The output shaft 22 is coupled to the automatic transmission unit 20. The power transmission system 8 is, for example, suitably used in a front-engine rear-drive (FR) vehicle in which the power transmission system 8 is longitudinally mounted with respect to the vehicle. An engine 10 is directly coupled to the input shaft 14 or indirectly coupled the input shaft 14 via a pulsation absorbing damper (not shown). The engine 10 is an internal combustion engine, such as a gasoline engine and a diesel engine, and serves as a driving force source for propelling the vehicle. A second motor generator MG2 is coupled to the power transmission member 18. The second motor generator MG2 serves as a motor and also serves as a driving force source for propelling the vehicle. The power of the engine 8 and the power of the second motor generator MG2 are transmitted from the automatic transmission unit 20 to the pair of drive wheels 34 sequentially via the output shaft 22, a differential gear unit (final reduction gear) 32 (see FIG. 7), a pair of axles, and the like. The power transmission member 18 is an output member of the electric differential unit 16, that is, a differential output member and also functions as an input member of the automatic transmission unit 20.

In this way, in the power transmission system 8, the engine 10 is directly coupled to the electric differential unit 16. The "direct coupling" means that the engine 10 is coupled to the electric differential unit 16 without intervening a hydraulic transmission device, such as a torque converter and a fluid coupling, and, for example, the above coupling via the pulsation absorbing damper, or the like, is included in the direct coupling. Note that the electric differential unit 16 and the automatic transmission unit 20 are formed symmetrically with respect to the axes thereof, so the lower halves below the axes are omitted in the skeleton diagrams of FIG. 1 and FIG. 7.

The electric differential unit 16 includes a first motor generator MG1 and a first planetary gear set 24. The first motor generator MG1 serves as a rotary machine. The first planetary gear set 24 is a power distribution mechanism that mechanically distributes power of the engine 10, input to the input shaft 14, and distributes the power of the engine 10 between the first motor generator MG1 and the power transmission member 18. The second motor generator MG2 is operably coupled to the electric differential unit 16 so as to be integrally rotatable with the power transmission member 18. The first motor generator MG1 and the second motor generator MG2 are able to selectively use the functions of an electric motor and a generator. The first planetary gear set 24 functions as a differential mechanism, and is, for example, a single pinion type planetary gear set having a predetermined gear ratio $\rho 1$ of about "0.418". The first planetary gear set 24 includes a first sun gear S1, first planetary gears P1, a first carrier CA1 and a first ring gear R1 as rotating elements (elements). The first carrier CA1 rotatably and revolvably supports the first planetary gears P1. The first ring gear R1 is in mesh with the first sun gear S1 via the first planetary gears P1. The first carrier CA1 is coupled to the input shaft 14, that is, the engine 10. The first sun gear S1 is coupled to the first motor generator MG1. The first ring gear R1 is coupled to the power transmission member 18. When the number of teeth of the first sun gear S1 is ZS1, and the number of teeth of the first ring gear R1 is ZR1, the above gear ratio $\rho 1$ is ZS1/ZR1.

The thus configured electric differential unit 16 is placed in a differential state in which three elements of the first planetary gear set 24, that is, the first sun gear S1, the first carrier CA1 and the first ring gear R1, are rotatable with respect to one another, that is, the differential action works. Thus, the output of the engine 10 is distributed between the first motor generator MG1 and the power transmission member 18, part of the power distributed from the engine 10 is used to drive the first motor generator MG1 for rotation. Therefore, electric energy is generated through regenerative control (power generation control) of the first motor generator MG1, and the second motor generator MG2 is controlled by the electric energy for power running, while redundant electric energy is stored in an electrical storage device 56 (see FIG. 7), which is a battery. In addition, the electric differential unit 16 functions as an electric differential device, and is placed in a so-called continuously variable state (electric CVT state). Hence, the rotation of the power transmission member 18 is continuously varied in accordance with the rotational speed of the first motor generator MG1 irrespective of a certain rotation of the engine 10. That is, the electric differential unit 16 functions as an electric continuously variable transmission of which the speed ratio $\gamma 0$ (rotational speed NIN of the input shaft 14/rotational speed N18 of the power transmission member 18) is continuously varied from a minimum value $\gamma 0$min to a maximum value $\gamma 0$max. In this way, by controlling the operating states of the first motor generator MG1, second motor generator MG2 and engine 10 that are coupled to the electric differential unit 16 so as to be able to transmit power, a differential state between the rotational speed of the input shaft 14, that is, the engine rotational speed NE, and the rotational speed of the power transmission member 18 is controlled.

The automatic transmission unit 20 constitutes part of the power transmission path from the electric differential unit 16 to the drive wheels 34. The automatic transmission unit 20 includes a single pinion type second planetary gear set 26, a single pinion type third planetary gear set 28 and a single pinion type fourth planetary gear set 30. The automatic transmission unit 20 is a planetary gear type multi-speed transmission that functions as a stepped automatic transmission. The second planetary gear set 26 includes a second sun gear S2, second planetary gears P2, a second carrier CA2 and a second ring gear R2. The second carrier CA2 rotatably and revolvably supports the second planetary gears P2. The second ring gear R2 is in mesh with the second sun gear S2 via the second planetary gears P2. The second planetary gear set 26 has a predetermined gear ratio $\rho 2$ of, for example, about "0.562". The third planetary gear set 28 includes a third sun gear S3, third planetary gears P3, a third carrier CA3 and a third ring gear R3. The third carrier CA3 rotatably and revolvably supports the third planetary gears P3. The third ring gear R3 is in mesh with the third sun gear S3 via the third planetary gears P3. The third planetary gear set 28 has a predetermined gear ratio $\rho 3$ of, for example, about "0.425". The fourth planetary gear set 30 includes a fourth sun gear S4, fourth planetary gears P4, a fourth carrier CA4 and a fourth ring gear R4. The fourth carrier CA4 rotatably and revolvably supports the fourth planetary gears P4. The fourth ring gear R4 is in mesh with the fourth sun gear S4 via the fourth planetary gears P4. The fourth planetary gear set 30 has a predetermined gear ratio $\rho 4$ of, for example, about "0.424". When the number of teeth of the second sun gear S2 is ZS2, the number of teeth of the second ring gear R2 is ZR2, the number of teeth of the third sun gear S3 is ZS3, the number of teeth of the third ring gear R3 is ZR3, the number of teeth of the fourth sun gear S4 is ZS4, and the number of teeth of the fourth ring gear R4 is ZR4, the gear ratio $\rho 2$ is ZS2/ZR2, the gear ratio $\rho 3$ is ZS3/ZR3, and the gear ratio $\rho 4$ is ZS4/ZR4.

In the automatic transmission unit 20, the second sun gear S2 and the third sun gear S3 are integrally coupled to each other and are selectively coupled to the power transmission member 18 via a second clutch C2 and selectively coupled to the case 12 via a first brake B1. The second carrier CA2 is selectively coupled to the case 12 via a second brake B2. The fourth ring gear R4 is selectively coupled to the case 12 via a third brake B3. The second ring gear R2, the third carrier CA3 and the fourth carrier CA4 are integrally coupled to one another and are integrally coupled to the output shaft 22. The third ring gear R3 and the fourth sun gear S4 are integrally coupled to each other and are selectively coupled to the power transmission member 18 via a first clutch C1.

In this way, the automatic transmission unit 20 and the electric differential unit 16 (power transmission member 18) are selectively coupled via the first clutch C1 or the second clutch C2 used to establish a plurality of gears of the automatic transmission unit 20. In other words, in a power transmission path between the power transmission member 18 and the automatic transmission unit 20, that is, a power transmission path from the electric differential unit 16 (power transmission member 18) to the drive wheels 34, the first clutch C1 and the second clutch C2 function as engagement devices that selectively switch between a power transmission state where power transmission in the power transmission path is allowed and a power cutoff state where power transmission in the power transmission path is cut off. That is, at least one of the first clutch C1 and the second clutch C2 is engaged to have the power transmission path placed in the power transmission state, or both the first clutch C1 and the second clutch C2 are released to have the power transmission path placed in the power cutoff state.

In addition, the automatic transmission unit 20 provides a gear ratio $\gamma$ (=rotational speed N18 of the power transmission member 18/rotational speed NOUT of the output shaft 22) that changes in substantially geometric progression gear by gear in such a manner that a clutch-to-clutch shift is carried out to selectively establish each gear. In the clutch-to-clutch shift, a release-side engagement device is released, and an engage-side engagement device is engaged. Specifically, as shown in the engagement operation table of FIG. 2, the first clutch C1 and the third brake B3 are engaged to establish a first-speed gear of which the gear ratio $\gamma 1$ is, for example, about "3.357" as a maximum value, the first clutch C1 and the second brake B2 are engaged to establish a second-speed gear of which the gear ratio $\gamma 2$ is, for example, about "2.180" smaller than that of the first-speed gear, the first clutch C1 and the first brake B1 are engaged to establish a third-speed gear of which the gear ratio $\gamma 3$ is, for example, about "1.424" smaller than that of the second-speed gear, and the first clutch C1 and the second clutch C2 are engaged to establish a fourth-speed gear of which the gear ratio $\gamma 4$ is, for example, about "1.000" smaller than that of the third-speed gear. In addition, the second clutch C2 and the third brake B3 are engaged to establish a reverse gear of which the gear ratio $\gamma R$ is, for example, about "3.209". In addition, the first clutch C1, the second clutch C2, the first brake B1, the second brake B2 and the third brake B3 are released to have the automatic transmission unit 20 placed in a neutral "N" state.

The first clutch C1, the second clutch C2, the first brake B1, the second brake B2 and the third brake B3 (hereinafter, referred to as clutches C and brakes B when it is not necessary to distinguish them from one another) are hydraulic frictional engagement devices as engagement elements that are often used in an existing vehicle automatic transmission. Each of the clutches C and brakes B is, for example, formed of a wet multiple-plate type in which mutually stacked multiple friction plates are pressed by a hydraulic actuator or a band brake in which one end of one or two bands wound around the outer peripheral surface of a rotating drum is tightened by a hydraulic actuator. Each of the clutches C and brakes B is used to selectively couple members on both sides thereof.

In the thus configured power transmission system 8, the electric differential unit 16, which functions as a continuously variable transmission, and the automatic transmission unit 20 constitute a continuously variable transmission as a whole. In addition, by controlling the speed ratio $\gamma 0$ of the electric differential unit 16 at constant, the electric differential unit 16 and the automatic transmission unit 20 may be configured as a state equivalent to a stepped transmission.

Specifically, the electric differential unit 16 functions as a continuously variable transmission, and the automatic transmission unit 20 connected in series with the electric differential unit 16 functions as a stepped transmission. Thus, for at least one gear M of the automatic transmission unit 20, a rotational speed input to the automatic transmission unit 20, that is, the rotational speed of the power transmission member 18 (hereinafter, power transmission member rotational speed N18), may be steplessly varied. Therefore, a stepless speed ratio range may be obtained in that gear M. Thus, the total speed ratio $\gamma T$ (=rotational speed NIN of the input shaft 14/rotational speed NOUT of the output shaft 22) of the power transmission system 8 is steplessly obtained, and a continuously variable transmission is constructed in the power transmission system 8. The total speed ratio $\gamma T$ of the power transmission system 8 is a speed ratio $\gamma T$ of the overall power transmission system 8 established on the basis of the speed ratio $\gamma 0$ of the electric differential unit 16 and the gear ratio $\gamma$ of the automatic transmission unit 20.

For example, for each of the first-speed gear to fourth-speed gear and reverse gear of the automatic transmission unit 20 as shown in the engagement operation table in FIG. 2, the power transmission member rotational speed N18 is steplessly varied, so a stepless speed ratio range may be obtained in each gear. Thus, each gear can be steplessly and continuously varied to obtain speed ratios between the adjacent gears, so the total speed ratio $\gamma T$ of the power transmission system 8 as a whole may be obtained steplessly.

In addition, the speed ratio $\gamma 0$ of the electric differential unit 16 is controlled at constant, and the clutches C and the brakes B are selectively engaged to selectively establish any one of the first-speed gear to the fourth-speed gear or the reverse gear. Thus, the total speed ratio $\gamma T$ of the power transmission system 8, which changes in substantially geometric progression, may be obtained gear by gear. Thus, the power transmission system 8 may be configured as a state equivalent to a stepped transmission.

For example, when the speed ratio $\gamma 0$ of the electric differential unit 16 is controlled so as to be fixed at "1", as shown in the engagement operation table of FIG. 2, the total speed ratio $\gamma T$ of the power transmission system 8, corresponding to each of the first-speed gear to the fourth-speed gear or reverse gear of the automatic transmission unit 20, may be obtained gear by gear. In addition, when, in the fourth-speed gear of the automatic transmission unit 20, the speed ratio $\gamma 0$ of the electric differential unit 16 is controlled to be fixed at, for example, about 0.7 smaller than "1", the total speed ratio $\gamma T$ of, for example, about "0.7" smaller than the fourth-speed gear of the automatic transmission unit 20 may be obtained.

Figure 3:
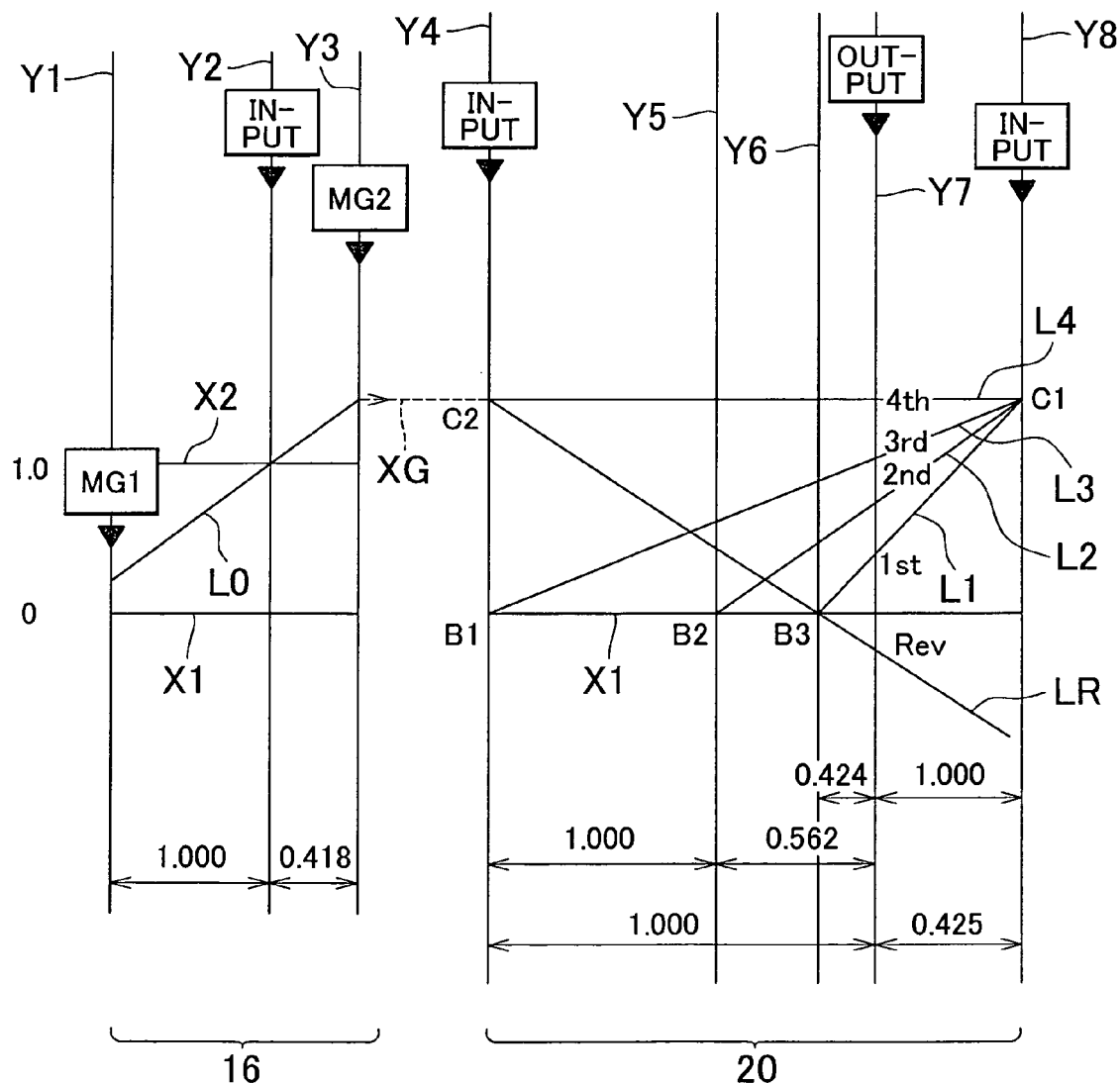
FIG. 3 is a nomograph that illustrates relative rotational speeds of rotating elements of an electric differential unit and the automatic transmission unit in the power transmission system shown in FIG. 1.

FIG. 3 shows a nomograph that can show the relative relationship in rotational speed among the rotating elements of which coupled states are different among gears in the power transmission system 8 formed of the electric differential unit 16 and the automatic transmission unit 20. The nomograph of FIG. 3 employs a two-dimensional coordinate system formed of an abscissa axis that represents a relationship among gear ratios $\rho$ of the planetary gear sets 24, 26, 28 and 30 and an ordinate axis that represents a relative rotational speed. The horizontal line X1 represents a rotational speed of zero, the horizontal line X2 represents a rotational speed of "1.0", that is, the rotational speed NE of the engine 10 coupled to the input shaft 14, and the horizontal line XG represents the rotational speed of the power transmission member 18.

In addition, three vertical lines Y1, Y2 and Y3 corresponding to three elements of the first planetary gear set 24 constituting the electric differential unit 16 represent, starting from the left, the relative rotational speed of the first sun gear S1 corresponding to a second rotating element RE2, the relative rotational speed of the first carrier CA1 corresponding to a first rotating element RE1 and the relative rotational speed of the first ring gear R1 corresponding to a third rotating element RE3. The intervals between those vertical lines Y1, Y2 and Y3 are determined on the basis of the gear ratio $\rho 1$ of the first planetary gear set 24. Furthermore, five vertical lines Y4, Y5, Y6, Y7 and Y8 of the automatic transmission unit 20 respectively represent, starting from the left, the mutually coupled second sun gear S2 and third sun gear S3 corresponding to a fourth rotating element RE4, the second carrier CA2 corresponding to a fifth rotating element RE5, the fourth ring gear R4 corresponding to a sixth rotating element RE6, the mutually coupled second ring gear R2, third carrier CA3 and fourth carrier CA4 corresponding to a seventh rotating element RE7, and the mutually coupled third ring gear R3 and fourth sun gear S4 corresponding to an eighth rotating element RE8. The intervals between those vertical lines Y4, Y5, Y6, Y7 and Y8 are respectively determined on the basis of the gear ratios $\rho 2$, $\rho 3$ and $\rho 4$ of the second, third and fourth planetary gear sets 26, 28 and 30. In the relationship between the vertical lines in the nomograph, when the interval between the sun gear and the carrier is set to an interval corresponding to "1", the interval between the carrier and the ring gear is set to an interval corresponding to the gear ratio $\rho$ of the planetary gear set.

When expressed using the nomograph of FIG. 3, the power transmission system 8 according to the present embodiment is configured to transmit (input) the rotation of the input shaft 14 to the automatic transmission unit 20 via the power transmission member 18 in such a manner that, in the electric differential unit 16, the first rotating element RE1 (first carrier CA1) of the first planetary gear set 24 is coupled to the input shaft 14, that is, the engine 10, the second rotating element RE2 is coupled to the first motor generator MG1, the third rotating element (first ring gear R1) RE3 is coupled to the power transmission member 18 and the second motor generator MG2. At this time, the relationship between the rotational speed of the first sun gear S1 and the rotational speed of the first ring gear R1 is shown by an oblique straight line L0 that passes the intersection of Y2 and X2.

For example, when the electric differential unit 16 is placed in a differential state where the first rotating element RE1 to the third rotating element RE3 are rotatable relative to one another, and when the rotational speed of the first ring gear R1 indicated by the intersection of the straight line L0 and the vertical line Y3 is bound to a vehicle speed V and is substantially constant, as the engine rotational speed NE is controlled to increase or decrease the rotational speed of the first carrier CA1 indicated by the intersection of the straight line L0 and the vertical line Y2, the rotational speed of the first sun gear S1 indicated by the intersection of the straight line L0 and the vertical line Y1, that is, the rotational speed of the first motor generator MG1, is increased or decreased.

In addition, when the rotational speed of the first sun gear S1 is adjusted to a rotational speed equal to the engine rotational speed NE in such a manner that the rotational speed of the first motor generator MG1 is controlled to fix the speed ratio γ0 of the electric differential unit 16 at "1", the straight line L0 coincides with the horizontal line X2, and the first ring gear R1, that is, the power transmission member 18, is rotated at the same rotational speed as the engine rotational speed NE. Alternatively, the rotational speed of the first sun gear S1 is set at zero in such a manner that the rotational speed of the first motor generator MG1 is controlled to fix the speed ratio γ0 of the electric differential unit 16 at, for example, about 0.7 smaller than "1", the power transmission member 18 is rotated at the rotational speed that is higher than the engine rotational speed NE.

In addition, in the automatic transmission unit 20, the fourth rotating element RE4 is selectively coupled to the power transmission member 18 via the second clutch C2 and selectively coupled to the case 12 via the first brake B1, the fifth rotating element RE5 is selectively coupled to the case 12 via the second brake B2, the sixth rotating element RE6 is selectively coupled to the case 12 via the third brake B3, the seventh rotating element RE7 is coupled to the output shaft 22, and the eighth rotating element RE8 is selectively coupled to the power transmission member 18 via the first clutch C1.

In the automatic transmission unit 20, as the rotation of the power transmission member 18 (third rotating element RE3), which is the output rotating member of the electric differential unit 16, is input to the eighth rotating element RE8 by engaging the first clutch C1, the first clutch C1 and the third brake B3 are engaged as shown in FIG. 3. Thus, the first-speed (1st) gear rotational speed of the output shaft 22 is indicated by the intersection of the oblique straight line L1 and the vertical line Y7. The oblique straight line L1 passes through the intersection of the vertical line Y8 and the horizontal line XG, and the intersection of the vertical line Y6 and the horizontal line X1. The vertical line Y8 indicates the rotational speed of the eighth rotating element RE8. The vertical line Y6 indicates the rotational speed of the sixth rotating element RE6. The vertical line Y7 indicates the rotational speed of the seventh rotating element RE7 coupled to the output shaft 22. Similarly, the second-speed (2nd) gear rotational speed of the output shaft 22 is indicated by the intersection of the oblique straight line L2 and the vertical line Y7. The oblique straight line L2 is determined by engaging the first clutch C1 and the second brake B2. The vertical line Y7 indicates the rotational speed of the seventh rotating element RE7 coupled to the output shaft 22. The third-speed (3rd) gear rotational speed of the output shaft 22 is indicated by the intersection of the oblique straight line L3 and the vertical line Y7. The oblique straight line L3 is determined by engaging the first clutch C1 and the first brake B1. The vertical line Y6 indicates the rotational speed of the seventh rotating element RE7 coupled to the output shaft 22. The fourth-speed (4th) gear rotational speed of the output shaft 22 is indicated by the intersection of the horizontal straight line L4 and the vertical line Y7. The horizontal straight line L4 is determined by engaging the first clutch C1 and the second clutch C2. The vertical line Y7 indicates the rotational speed of the seventh rotating element RE7 coupled to the output shaft 22. The reverse gear (R) rotational speed of the output shaft 22 is indicated by the intersection of the oblique straight line LR and the vertical line Y7. The oblique straight line LR is determined by engaging the second clutch C2 and the third brake B3. The vertical line Y7 indicates the rotational speed of the seventh rotating element RE7 coupled to the output shaft 22.

Figure 4:
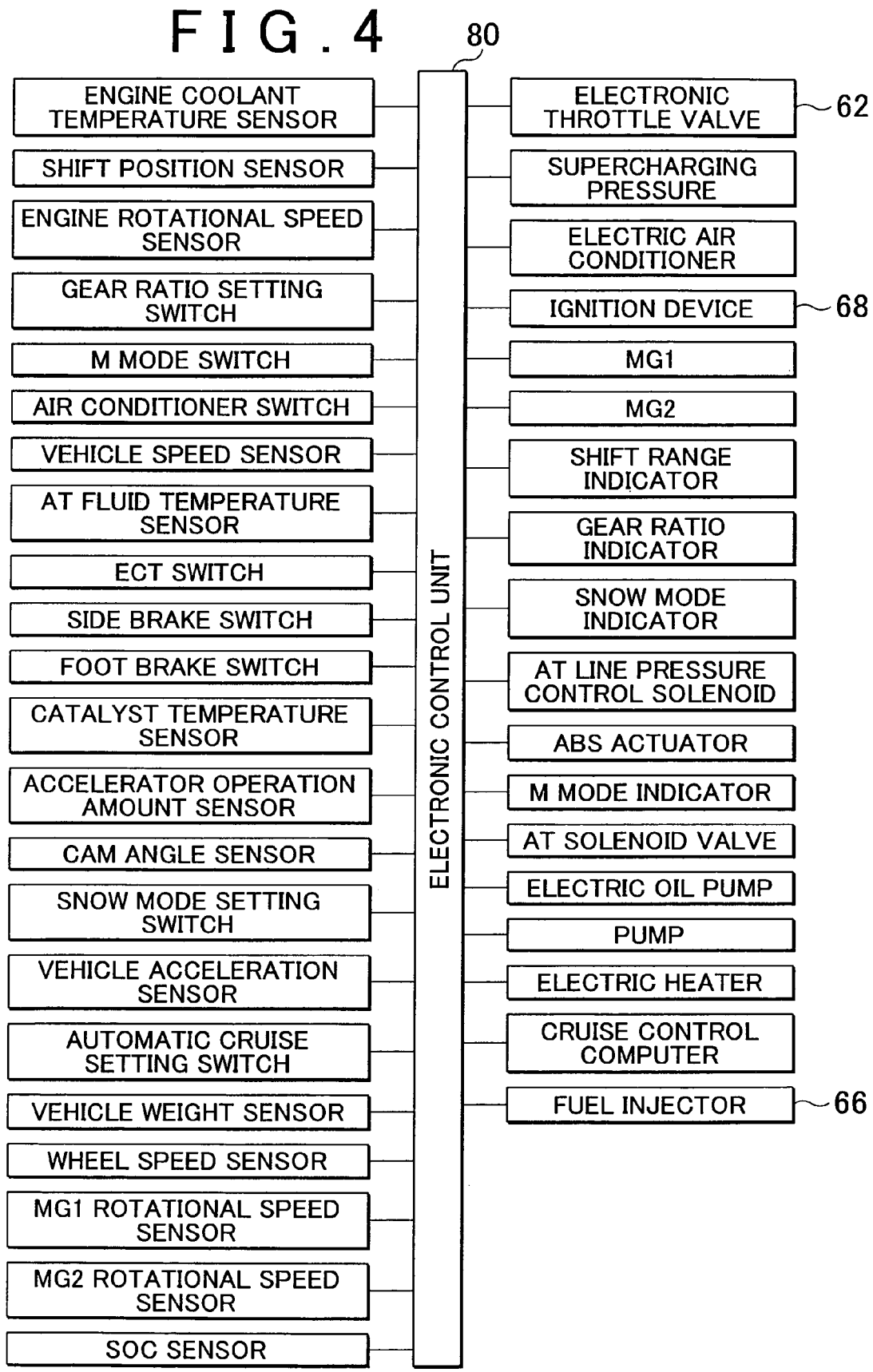
FIG. 4 is a view that illustrates examples of input/output signals of an electronic control unit equipped for the power transmission system shown in FIG. 1.

FIG. 4 shows an example of signals input to an electronic control unit 80 and signals output from the electronic control unit 80 for controlling the power transmission system 8 according to the present embodiment. The electronic control unit 80 is formed to include a so-called microcomputer provided with a CPU, a ROM, a RAM, an input/output interface, and the like, and utilizes the temporary storage function of the RAM while carrying out signal processing in accordance with a program prestored in the ROM to thereby execute drive control, such as hybrid drive control related to the engine 10 and the first and second motor generators MG1 and MG2 and shift control of the automatic transmission unit 20.

As shown in FIG. 4, the electronic control unit 80 is supplied from sensors, switches, and the like, with a signal that indicates an engine coolant temperature TEMPW, a signal that indicates a shift position $P_{SH}$ of a shift lever 52 (see FIG. 6), the number of operations in "M" position, and the like, a signal that indicates the engine rotational speed NE, which is the rotational speed of the engine 10, a signal that indicates a gear ratio setting value, a signal that issues an instruction for an M mode (manual shift drive mode), a signal that indicates an operation of an air conditioner, a signal that indicates a vehicle speed V corresponding to the rotational speed NOUT of the output shaft 22, a signal that indicates a hydraulic fluid temperature TOIL of the automatic transmission unit 20, a signal that indicates a side brake operation, a signal that indicates a foot brake operation, a signal that indicates a catalyst temperature, a signal that indicates an accelerator operation amount Acc, which is an amount by which an accelerator pedal is operated, corresponding to an amount of power required by a driver, a signal that indicates a cam angle, a signal that indicates a snow mode setting, a signal that indicates a longitudinal acceleration G of the vehicle, a signal that indicates an automatic cruise drive mode, a signal that indicates a weight of the vehicle (vehicle weight), a signal that indicates a wheel speed of each drive wheel, a signal that indicates a rotational speed NMG1 of the first motor generator MG1, a signal that indicates a rotational speed NMG2 of the second motor generator MG2, a signal that indicates a level of charge (state of charge) SOC of the electrical storage device 56, and the like. Note that the second motor generator rotational speed NMG2 is equal to the power transmission member rotational speed N18.

In addition, control signals are output from the electronic control unit 80 to an engine output controller 58 (see FIG. 7) that controls engine power. The control signals, for example, include a driving signal supplied to a throttle actuator 64 for operating the throttle valve opening degree θTH of an electronic throttle valve 62 provided in an intake pipe 60 of the engine 10, a fuel supply rate signal for controlling a fuel supply rate into the intake pipe 60 or into a cylinder of the engine 10 by a fuel injector 66, an ignition signal that instructs an ignition device 68 about an ignition timing of the engine 10, a supercharging pressure adjustment signal for adjusting a supercharging pressure, and the like. The control signals further include an electric air conditioner driving signal for activating an electric air conditioner, an instruction signal for instructing the first motor generator MG1 and the second motor generator MG2 to be activated, a shift position (operating position) indication signal for activating a shift indicator, a gear ratio indication signal for indicating a gear ratio, a snow mode indication signal for indicating a snow mode, an ABS activation signal for activating an ABS actuator that prevents a slip of drive wheels during braking, an M mode indication signal for indicating that an M mode is selected, a valve instruction signal for operating electromagnetic valves (linear solenoid valves) of a hydraulic control circuit 70 (see FIG. 5 and FIG. 7) in order to control the hydraulic actuators of the hydraulic frictional engagement devices of the electric differential unit 16 and automatic transmission unit 20, a signal for regulating a line hydraulic pressure PL by a regulator valve (pressure regulating valve) provided in the hydraulic control circuit 70, a driving instruction signal for operating an electric hydraulic pump, which is a hydraulic pressure source of a source pressure that is regulated to obtain the line hydraulic pressure PL, a signal for driving an electric heater, and a signal supplied to a cruse control computer.

Figure 5:
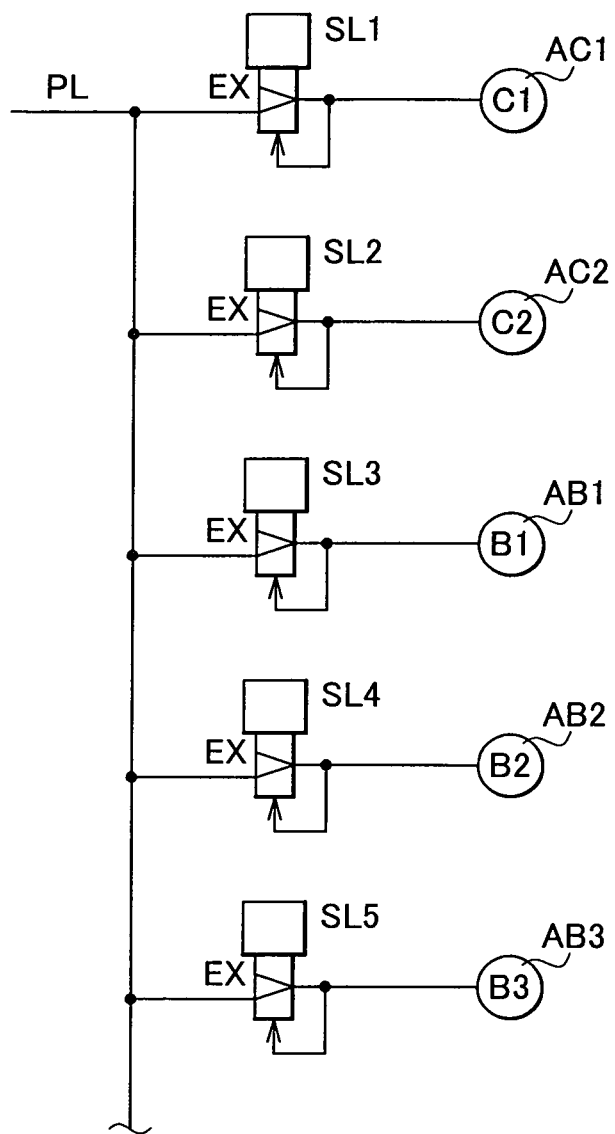
FIG. 5 is a hydraulic circuit diagram of linear solenoid valves, and the like, that control engagement and release of the hydraulic frictional engagement devices of the automatic transmission unit equipped for the power transmission system shown in FIG. 1.

FIG. 5 is a circuit diagram related to linear solenoid valves SL1 to SL5 that respectively control operations of the hydraulic actuators (hydraulic cylinders) AC1, AC2, AB1, AB2 and AB3 of the clutches C1 and C2 and brakes B1 to B3 in the hydraulic control circuit 70. Each of the linear solenoid valves SL1 to SL5 is supplied with the line hydraulic pressure PL. The linear solenoid valves SL1 to SL5 respectively regulate the line hydraulic pressure PL to engagement pressures PC1, PC2, PB1, PB2 and PB3 in accordance with instruction signals from the electronic control unit 80, and directly supply the engagement pressures PC1, PC2, PB1, PB2 and PB3 to the respective hydraulic actuators AC1, AC2, AB1, AB2 and AB3. The line hydraulic pressure PL is regulated at a value corresponding to an engine load, or the like, indicated by an accelerator operation amount Acc or a throttle valve opening degree θTH, by, for example, a relief regulating valve (regulator valve).

The linear solenoid valves SL1 to SL5 basically have the same configuration. The linear solenoid valves SL1 to SL5 are independently excited or deexcited by the electronic control unit 80 to independently regulate hydraulic pressures supplied to the hydraulic actuators AC1, AC2, AB1, AB2 and AB3, thus controlling the engagement pressures PC1, PC2, PB1, PB2 and PB3 of the clutches C1 and C2 and brakes B1 to B3. Then, the automatic transmission unit 20 establishes each gear in such a manner that the predetermined engagement devices are engaged, for example, as shown in the engagement operation table of FIG. 2. In addition, in the shift control of the automatic transmission unit 20, for example, a so-called clutch-to-clutch shift is performed. In the clutch-to-clutch shift, engagement and release of the clutches C and brakes B associated with the shift are simultaneously controlled.

Figure 6:
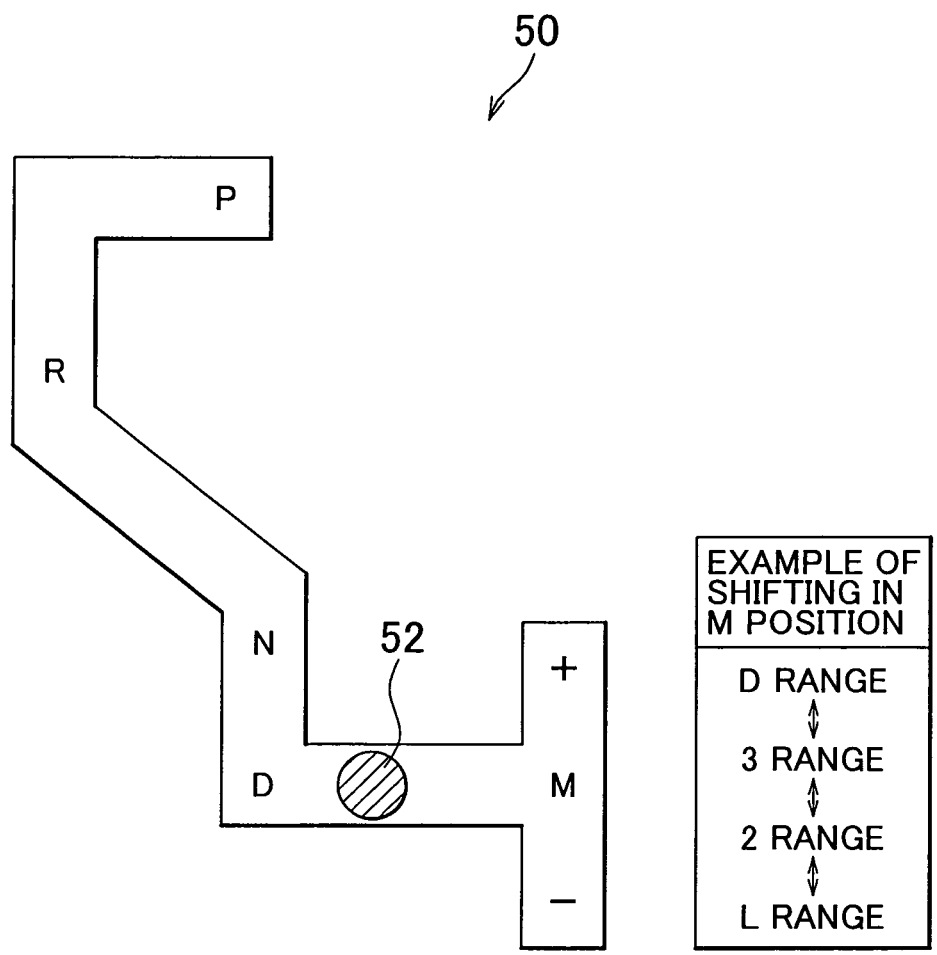
FIG. 6 is a view that illustrates an example of a shift operating device provided for the power transmission system shown in FIG. 1.

FIG. 6 is a view that shows an example of a shift operating device 50, which serves as a shifting device for manually shifting a plurality of types of shift positions $P_{SH}$. The shift operating device 50 is, for example, arranged on the side of a driver seat, and includes a shift lever 52. The shift lever 52 is operated to select the plurality of types of shift positions $P_{SH}$. The shift lever 52 is manually operated to a parking position "P (parking)", a reverse drive position "R (reverse)", a neutral position "N (neutral)", an automatic forward drive position "D (drive)", or a manual forward drive position "M (manual)". In the parking position, the power transmission path in the power transmission system 8, that is, in the automatic transmission unit 20, is cut off and placed in a neutral state, and the output shaft 22 of the automatic transmission unit 20 is locked. The reverse drive position is used in reverse driving. In the neutral position, the power transmission path in the power transmission system 8 is cut off and placed in a neutral state. In the automatic forward drive position, an automatic transmission mode is established, and automatic transmission control is performed within a variable range of a total speed ratio γT of the power transmission system 8, obtained by a stepless speed ratio range of the electric differential unit 16 and a gear that undergoes automatic transmission control within the range of the first-speed gear to the fourth-speed gear of the automatic transmission unit 20. In the manual forward drive position, a manual transmission drive mode (manual mode) is established, and a so-called shift range is set to limit a high-speed side gear in the automatic transmission unit 20.

For example, the hydraulic control circuit 70 is electrically switched so that the reverse gear "R", neutral "N", or any one of forward gears in the first-speed gear to the fourth speed gear, shown in the engagement operation table of FIG. 2 are established as the shift lever 52 is manually operated to a corresponding one of the shift positions $P_{SH}$.

In the shift positions SP indicated by the "P" to "M" positions, the "P" position and the "N" position are non-drive positions that are selected when the vehicle does not drive, and are non-drive positions to select switching to a power cutoff state of the power transmission path. In the power cutoff state, the power transmission path in the automatic transmission unit 20 is cut off so that both the first clutch C1 and the second clutch C2 are released, for example, as shown in the engagement operation table of FIG. 2. In addition, the "R" position, the "D" position and the "M" position are drive positions that are selected when the vehicle drives, and are drive positions to select switching to a power transmission state of the power transmission path. In the power transmission state, the power transmission path in the automatic transmission unit 20 is established so that at least one of the first clutch C1 and the second clutch C2 is engaged, for example, as shown in the engagement operation table of FIG. 2.

Specifically, when the shift lever 52 is manually operated from the "P" position or the "N" position to the "R" position, the second clutch C2 is engaged to change the power transmission path in the automatic transmission unit 20 from the power cutoff state to the power transmission state. When the shift lever 52 is manually operated from the "N" position to the "D" position, at least the first clutch C1 is engaged to change the power transmission path in the automatic transmission unit 20 from the power cutoff state to the power transmission state. In addition, when the shift lever 52 is manually operated from the "R" position to the "P" position or the "N" position, the second clutch C2 is released to change the power transmission path in the automatic transmission unit 20 from the power transmission state to the power cutoff state. When the shift lever 52 is manually operated from the "D" position to the "N" position, the first clutch C1 is released or both the first clutch C1 and the second clutch C2 are released to change the power transmission path in the automatic transmission unit 20 from the power transmission state to the power cutoff state.

Figure 7:
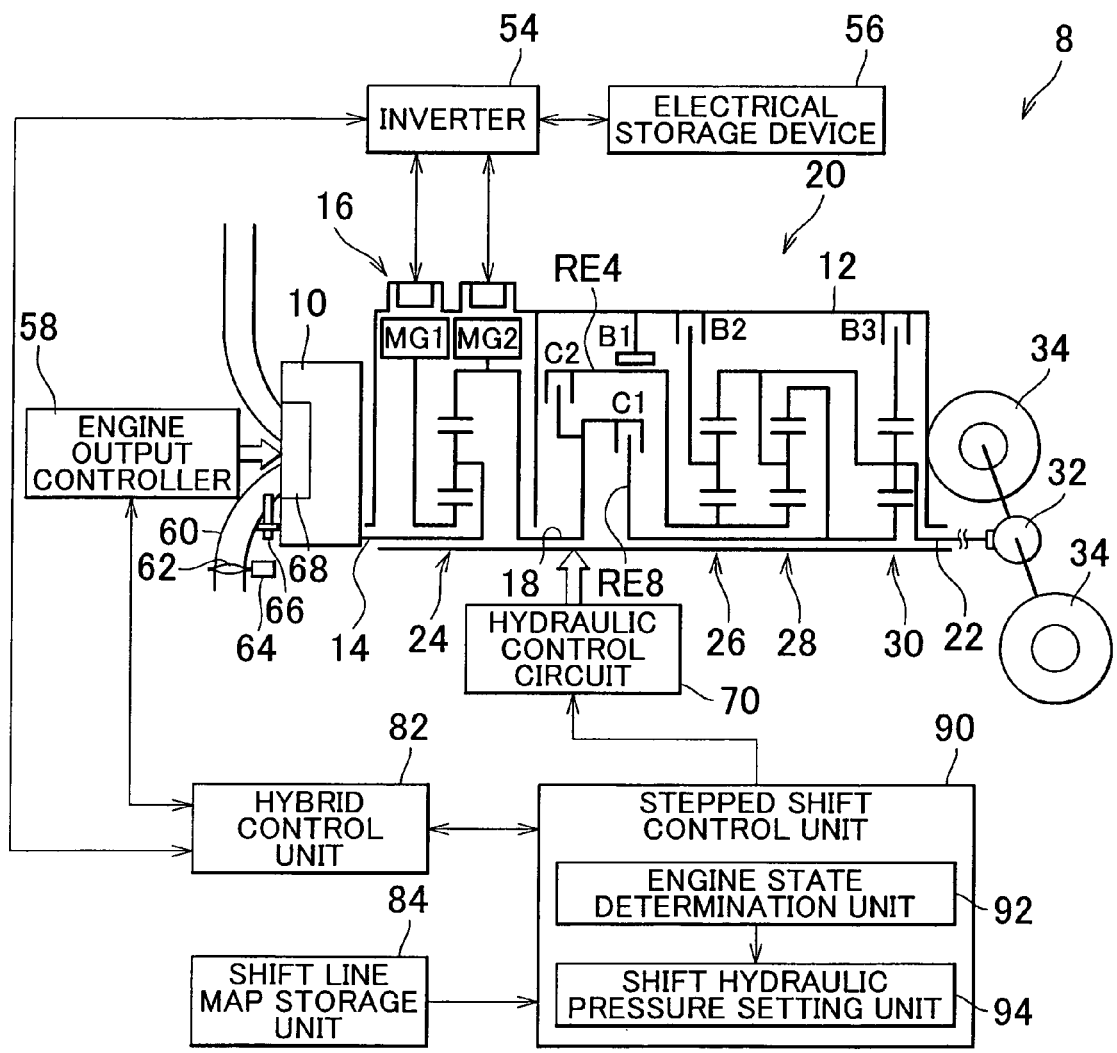
FIG. 7 is a functional block diagram that illustrates a relevant portion of control functions executed by the electronic control unit shown in FIG. 4.

FIG. 7 is a functional block diagram that illustrates a relevant portion of control functions executed by the electronic control unit 80, functionally including a hybrid control unit 82 and a stepped shift control unit 90. The hybrid control unit 82 operates the engine 10 in an efficient operating region while controlling a driving force distribution between the engine 10 and the second motor generator MG2 and/or optimally changing a reaction force caused by power generation of the first motor generator MG1, thus controlling the speed ratio γ0 of the electric differential unit 16 as an electric continuously variable transmission. That is, at a vehicle speed V at that time, the hybrid control unit 82 calculates a target (required) power of a vehicle on the basis of an accelerator operation amount Acc, which is an amount of power required by the driver, and the vehicle speed V, calculates a required total target power on the basis of the target power of the vehicle and a required charge value, calculates a target engine power in consideration of a transmission loss, an auxiliary machine load, an assist torque of the second motor generator MG2, and the like, so as to obtain the total target power, and then controls the engine 10 so as to attain the engine rotational speed NE and engine torque TE by which the target engine power can be obtained and controls the amount of electric power generated by the first motor generator MG1.

Figure 9:
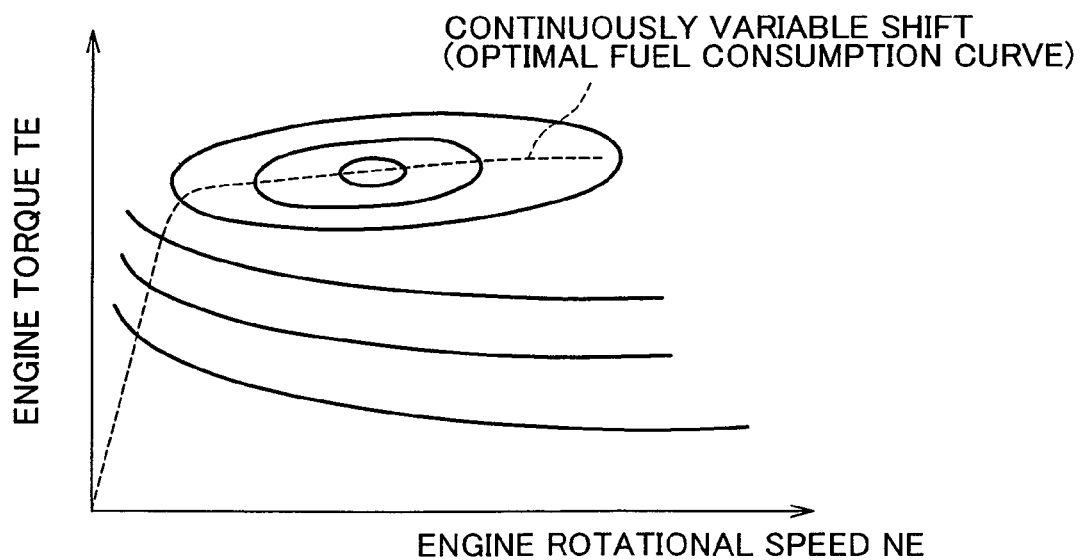
FIG. 9 is an example of a fuel consumption map of an engine equipped for the power transmission system shown in FIG. 1.

In addition, in order to match the engine rotational speed NE, which is determined to operate the engine 10 at an efficient operating region, with the rotational speed of the power transmission member 18 determined by the vehicle speed V and the gear of the automatic transmission unit 20, the electric differential unit 16 is caused to function as an electric continuously variable transmission. That is, the hybrid control unit 82 determines a target total speed ratio γT of the power transmission system 8 so that the engine 10 is operated along with an optimal fuel consumption rate curve (fuel consumption map, relationship) of the engine 10. The optimal fuel consumption rate curve is indicated by the broken line in a two-dimensional coordinate system of an engine rotational speed NE and an output torque of the engine 10 (engine torque) in FIG. 9. The optimal fuel consumption rate curve is empirically obtained and prestored so as to be compatible between drivability and fuel economy during continuously variable transmission drive mode. Then, the hybrid control unit 82 controls the speed ratio γ0 of the electric differential unit 16 in consideration of the gear of the automatic transmission unit 20 so as to obtain the target total speed ratio γT.

At this time, the hybrid control unit 82 supplies electric energy generated by the first motor generator MG1 to the electrical storage device 56 or to the second motor generator MG2 via an inverter 54. Thus, a major portion of the power of the engine 10 is mechanically transmitted to the power transmission member 18. On the other hand, a portion of the power of the engine 10 is consumed for power generation of the first motor generator MG1 and converted into electric energy, which is supplied to the second motor generator MG2 via the inverter 54 to drive the second motor generator MG2, thus being transmitted from the second motor generator MG2 to the power transmission member 18. From generation of the electric energy to consumption in the second motor generator MG2, associated devices constitute an electrical path that converts a portion of the power of the engine 10 into electric energy and then converts the electric energy into mechanical energy.

In addition, the hybrid control unit 82 controls the first motor generator rotational speed NMG1 by means of the electric CVT function of the electric differential unit 16 to maintain the engine rotational speed NE at substantially constant or control the engine rotational speed NE to a selected rotational speed, irrespective of whether the vehicle is stopped or driving. For example, as is apparent from the nomograph of FIG. 3, when the hybrid control unit 82 increases the engine rotational speed NE while the vehicle is driving, the hybrid control unit 82 maintains the second motor generator rotational speed NMG2 that is bound to a vehicle speed V (drive wheels 34) at substantially constant while increasing the first motor generator rotational speed NMG1.

The case where the engine 10 is started in the motor drive mode will be specifically described. Regeneration and, where necessary, power running control of the first motor generator MG1 are performed to crank the engine 10 to increase the engine rotational speed to a predetermined rotational speed and then carries out fuel injection control, and the like, to start the engine 10. Then, the reaction force at this time is received by the second motor generator MG2. Therefore, by adding the torque of the second motor generator MG2 by the amount of torque of the reaction force, it is possible to suppress fluctuations in driving force at the time of an engine start. In the time chart shown in FIG. 11, the graphs of MG1 torque (torque of the first motor generator MG1), MG2 torque (torque of the second motor generator MG2) and the engine rotational speed NE, indicated by the solid line, show the case when engine start control is executed. The time t2 is a time at which control for starting the engine 10 is started. The time t6 is a time at which the engine 10 begins complete explosion to rotate by itself (start operation). The MG2 torque is controlled in correspondence with the MG1 torque so as to cancel the reaction force generated in the power transmission member 18 because of the MG1 torque.

In addition, the hybrid control unit 82 functionally includes an engine output control unit. The engine output control unit outputs not only an instruction for causing the throttle actuator 64 to open or close the electronic throttle valve 62 for throttle control, but also an instruction for causing the fuel injector 66 to control a fuel injection rate and/or a fuel injection timing for fuel injection control and an instruction for causing the ignition device 68, such as an igniter, to control an ignition timing for ignition timing control, to the engine output controller 58 alone or in combination to thereby control the power of the engine 10 so as to generate a required engine power. For example, the hybrid control unit 82 basically drives the throttle actuator 64 on the basis of an accelerator operation amount Acc by referring to the prestored relationship (not shown), and performs throttle control such that the throttle valve opening degree θTH increases as the accelerator operation amount Acc increases.

In addition, the hybrid control unit 82 is able to perform motor drive mode by means of the electric CVT function (differential action) of the electric differential unit 16 irrespective of whether the engine 10 is stopped or idling. For example, the hybrid control unit 82 performs motor drive mode in a relatively low output torque region, that is, a low engine torque region, in which engine efficiency is generally lower than that in a high torque region, or in a region in which a vehicle speed is relatively low, that is, a low load region. In the motor drive mode, the engine 10 is stopped or idling, and only the second motor generator MG2 is used as the driving force source to drive the vehicle. For example, in FIG. 8, a region adjacent to the origin point, that is, on a low torque side or a low vehicle speed side, with respect to the solid line A is a predetermined motor drive region. In addition, when the engine 10 is stopped in the motor drive mode, the hybrid control unit 82 controls the first motor generator rotational speed NMG1 at a negative rotational speed to idly rotate by, for example, placing the first motor generator MG1 in a no-load state, and, where necessary, maintains the engine rotational speed NE at zero or substantially zero by means of the electric CVT function (differential action) of the electric differential unit 16 in order to improve fuel economy by suppressing a drag of the engine 10. Even during the motor drive mode, the hybrid control unit 82 operates the engine 10 where necessary in order to, for example, charge the electrical storage device 56, carry out warm-up, or the like.

Figure 8:
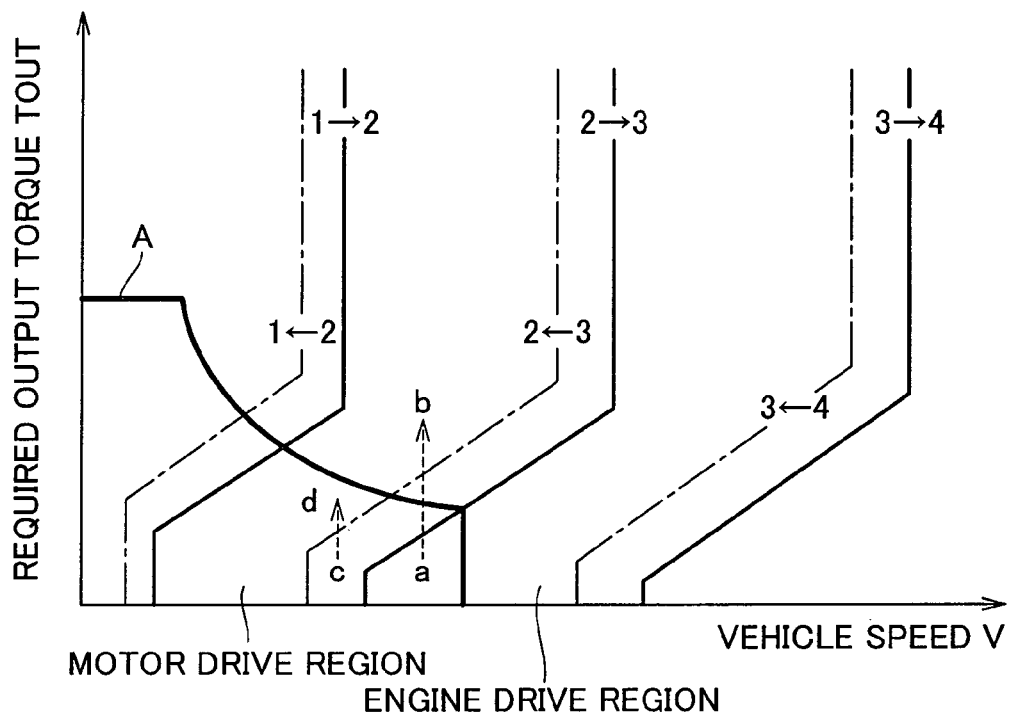
FIG. 8 is a view that shows an example of a driving force source map used in driving force source switching control for switching between an engine drive mode and a motor drive mode together with an example of a shift map used in shift control of the automatic transmission unit.

In addition, even during the engine drive mode in which the engine 10 is used as the driving force source to drive the vehicle, the hybrid control unit 82 supplies electric energy from the first motor generator MG1 through the above described electrical path and/or electric energy from the electrical storage device 56 to the second motor generator MG2, and then drives the second motor generator MG2 to apply torque to the drive wheels 34. By so doing, the hybrid control unit 82 is able to perform so-called torque assist for assisting the power of the engine 10. For example, when the accelerator pedal is depressed by a large amount for acceleration or when the vehicle is going up on a hill, the hybrid control unit 82 controls the second motor generator MG2 for power running to perform torque assist. In FIG. 8, a region outside the solid line A, that is, on a high torque side or a high vehicle speed side, is an engine drive region in which engine drive is performed; however, torque assist is, where necessary, performed by the second motor generator MG2.

In addition, the hybrid control unit 82 places the first motor generator MG1 in a no-load state to freely rotate or idle to make it possible to disable the electric differential unit 16 from transmitting torque, which is equivalent to a state where the power transmission path in the electric differential unit 16 is cut off and no torque is output from the electric differential unit 16. That is, the hybrid control unit 82 places the first motor generator MG1 in a no-load state to make it possible to set the electric differential unit 16 in a neutral state where the power transmission path of the electric differential unit 16 is electrically cut off.

In addition, during coasting with an accelerator off state or during braking with a foot brake, the hybrid control unit 82 functions as a regenerative control unit that drives the second motor generator MG2 for rotation to operate as a generator by kinetic energy of the vehicle, that is, reverse driving force transmitted from the drive wheels 34 to the engine 10 side and then charges the electrical storage device 56 with the electric energy via the inverter 54 in order to improve fuel economy. The regenerative control is controlled to gain a regeneration amount that is determined on the basis of, for example, a state of charge SOC of the electrical storage device 56 and a braking force assigned to a braking force by a hydraulic brake for obtaining a braking force corresponding to a brake pedal operation amount.

On the other hand, the stepped shift control unit 90 determines whether to shift the automatic transmission unit 20, that is, determines a gear into which the automatic transmission unit 20 should shift, on the basis of a vehicle state indicated by an actual vehicle speed V and a required output torque TOUT by referring to the shift line map shown in FIG. 8, that is, the prestored relationship (shift line map, shift map) having upshift lines (solid lines) and downshift lines (alternate long and short dashed lines) using a vehicle speed V and a required output torque TOUT (accelerator operation amount Acc, and the like) as parameters, and then performs automatic transmission control over the automatic transmission unit 20 so as to obtain the determined gear. The shift line map is, for example, prestored in a shift line map storage unit 84.

At this time, the stepped shift control unit 90 outputs an instruction (shift output instruction, hydraulic pressure instruction) for engaging or releasing the hydraulic frictional engagement devices associated with the shift of the automatic transmission unit 20, that is, an instruction for carrying out a clutch-to-clutch shift by releasing the release-side engagement device associated with the shift of the automatic transmission unit 20 and engaging the engage-side engagement device associated with the shift of the automatic transmission unit 20, to the hydraulic control circuit 70 so as to establish a predetermined gear, for example, in accordance with the engagement operation table shown in FIG. 2. The hydraulic control circuit 70 uses the linear solenoid valves SL to vary the engagement pressures of the hydraulic frictional engagement devices associated with that shift in accordance with a predetermined hydraulic pressure variation pattern to release the release-side frictional engagement device while engaging the engage-side frictional engagement device, thus carrying out the shift of the automatic transmission unit 20.

The stepped shift control unit 90 also functionally includes the engine state determination unit 92 and the shift hydraulic pressure setting unit 94. The stepped shift control unit 90 executes signal processing in accordance with the flowchart shown in FIG. 10 to predict a variation in input torque on the basis of the operating state of the engine 10 when the automatic transmission unit 20 shifts gears, and separately sets the hydraulic pressures, that is, torque transmission capacities, of the hydraulic frictional engagement devices (clutches C and brakes B) in advance. Steps S2 and S4 in FIG. 10 may be regarded as the engine state determination unit 92. Steps S3, S5 and S6 may be regarded as the shift hydraulic pressure setting unit 94. In addition, FIG. 11 is an example of a time chart of changes in rotational speed and torque of various components when hydraulic pressure control of the release-side and engage-side hydraulic frictional engagement devices is carried out in accordance with the flowchart shown in FIG. 10 at the time of a downshift from the third-speed gear (3rd) to the second-speed gear (2nd). In the third to second downshift, as is apparent from the operation table of FIG. 2, the first brake B1 is the release-side frictional engagement device, and the second brake B2 is the engage-side frictional engagement device. The engagement pressures PB1 and PB2 of the first brake B1 and second brake B2 respectively correspond to a release-side hydraulic pressure and an engage-side hydraulic pressure, and also correspond to torque transmission capacities. Note that an actual release-side hydraulic pressure and engage-side hydraulic pressure are varied with a predetermined delay of response to hydraulic pressure instruction values shown in FIG. 11.

Figure 10:
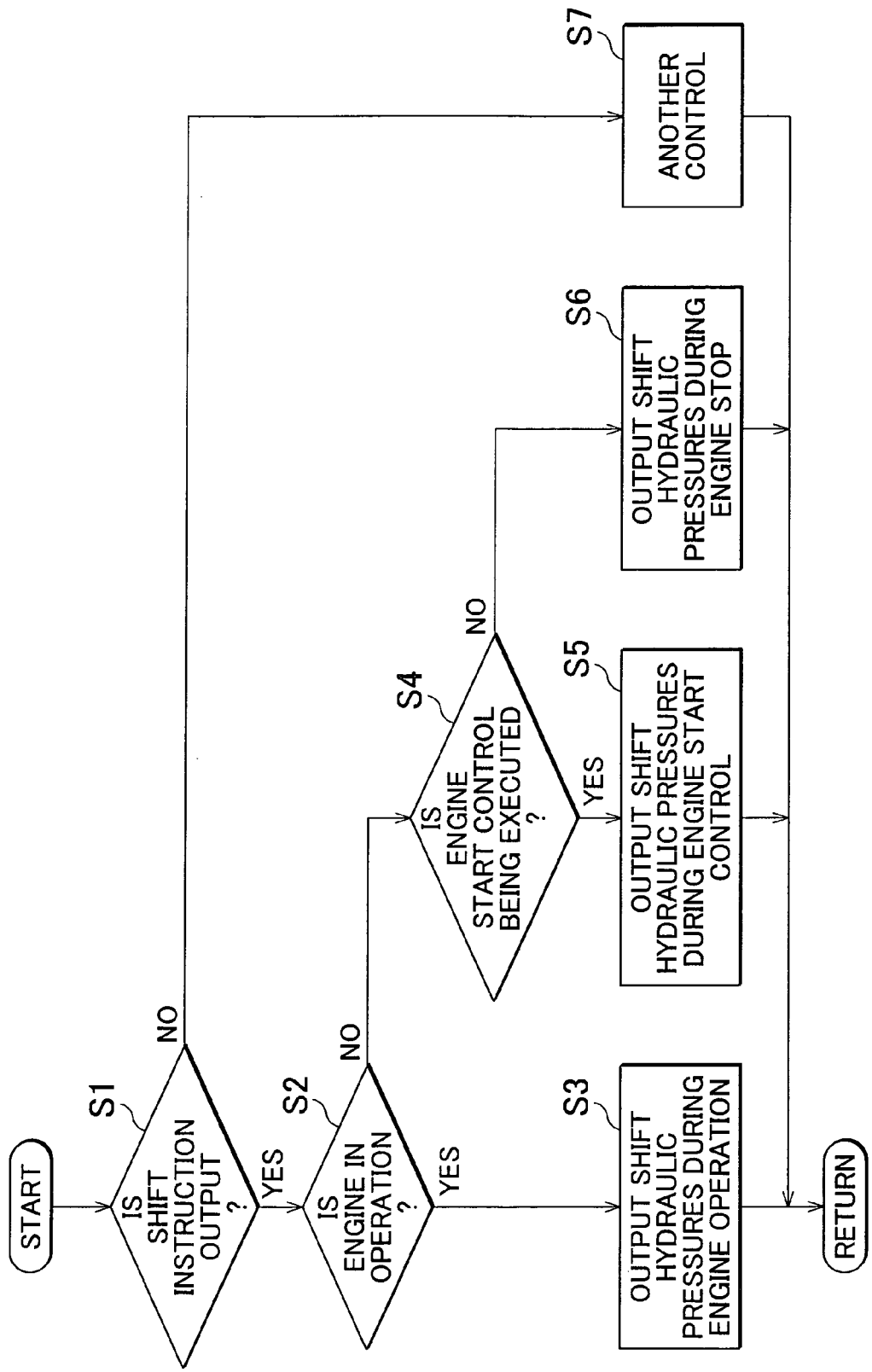
FIG. 10 is a flowchart that specifically illustrates the content of signal processing executed by an engine state determination unit and a shift hydraulic pressure setting unit shown in FIG. 7.
Figure 11:
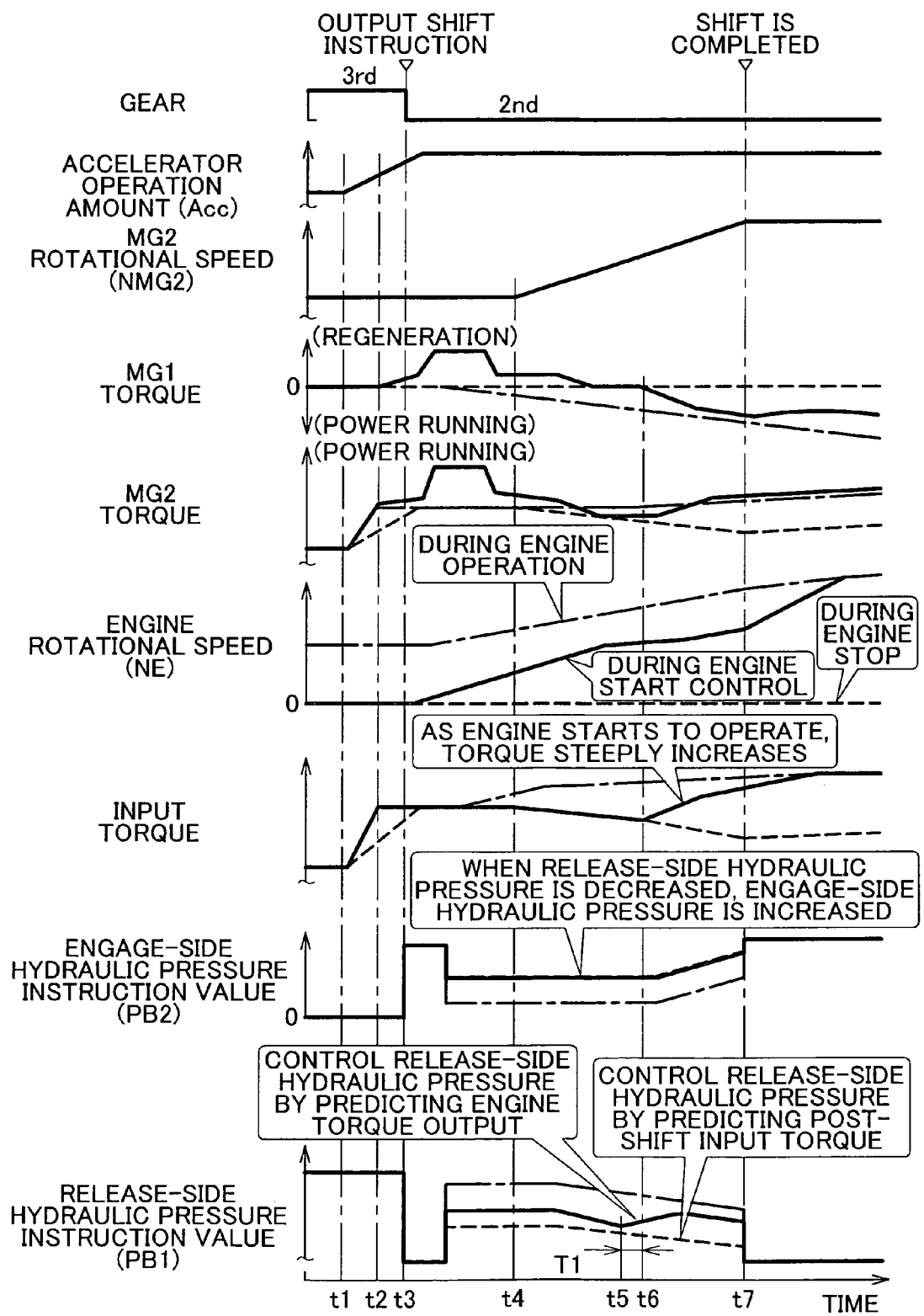
FIG. 11 is an example of a time chart of changes in torque, rotational speed, and the like, of various components when signal processing is executed in accordance with the flowchart shown in FIG. 10 during shifting in solid line, dotted line and broken line on the basis of an operating state of the engine.

In step S1 in FIG. 10, shift determination is performed in accordance with the shift line map shown in FIG. 8, or it is determined whether a shift instruction for shifting the gear of the automatic transmission unit 20 is output through driver's manual shift operation by the shift lever 52, that is, whether hydraulic pressure control of the hydraulic frictional engagement devices associated with the shift is started. Although the above hydraulic pressure control may be executed for all the shift instructions, it is also applicable that the hydraulic pressure control is executed only for any one of a downshift and an upshift or the hydraulic pressure control is executed only at the time of a shift of a driving state (power on state) where the accelerator pedal is depressed. In those cases, it is only necessary to determine whether a shift instruction coincides with a target shift instruction. Then, when no shift instruction is output, another control is executed in step S7 and then the process directly ends. However, when a shift instruction is output, step S2 and the following steps are executed.

The time t3 in FIG. 11 is a time at which a shift instruction for shifting from third to second is output. The time chart shown in FIG. 11 shows the case where a downshift is automatically carried out in accordance with the shift line map shown in FIG. 8 through depression of the accelerator pedal (increase in required output torque TOUT). The solid lines and broken lines of FIG. 11 show the case where, as indicated by the dotted arrow ab in FIG. 8, the required output torque TOUT changes to switch the motor drive mode into the engine and motor assist drive mode, and a shift instruction for downshifting from third to second is output. The time t1 is a time at which depression of the accelerator pedal (additional depression) is started. The time t2 is a time at which the second motor generator MG2 reaches an allowable maximum power and control for switching into the engine and motor assist drive mode is started. The solid lines in FIG. 11 shows the case where the engine is stopped during the motor drive mode, and control for starting the engine 10 is started at time t2. The alternate long and short dashed lines in FIG. 11 show the case where the engine is already in operation during the motor drive mode for carrying out warm-up, or the like. In addition, the broken lines in FIG. 11 show the case where, as indicated by the dotted arrow cd in FIG. 8, the required output torque TOUT changes and an instruction for downshifting from third to second is output during the motor drive mode in a state where the engine 10 is stopped. Strictly, the torque (MG2 torque) and rotational speed (MG2 rotational speed) of the second motor generator MG2 and the magnitude of input torque are different from those of the solid lines and alternate long and short dashed lines.

In step S2 of FIG. 10, it is determined whether the engine 10 is already in operation for carrying out warm-up, or the like. When the engine is in operation, step S3 is executed. In step S3, shift hydraulic pressures, that is, the engage-side hydraulic pressure and release-side hydraulic pressure of the frictional engagement devices associated with the shift, are controlled in accordance with predetermined hydraulic pressure instruction values during engine operation. When negative determination is made in step S2, that is, when the engine is not in operation, it is determined in step S4 whether engine start control is being executed. When the engine start control is being executed, step S5 is executed. In step S5, shift hydraulic pressures, that is, the engage-side hydraulic pressure and release-side hydraulic pressure of the frictional engagement devices associated with the shift, are controlled in accordance with predetermined hydraulic pressure instruction values during engine start control. In addition, when negative determination is made in step S4, that is, when the engine is stopped and the engine is neither in operation nor in start control, step S6 is executed. Shift hydraulic pressures, that is, the engage-side hydraulic pressure and release-side hydraulic pressure of the frictional engagement devices associated with the shift, are controlled in accordance with predetermined hydraulic pressure instruction values during engine stop.

The hydraulic pressure values corresponding to the instruction values of the release-side hydraulic pressure and engage-side hydraulic pressure and the variation patterns of the hydraulic pressures set in steps S3, S5 or S6 are predetermined by predicting a variation in input torque on the basis of the operating state of the engine 10 in consideration of a delay of response of hydraulic pressure control. For example, in the case of setting in step S3 during operation of the engine, as indicated by the alternate long and short dashed lines in FIG. 11, as the motor drive mode is switched to the engine and motor assist drive mode, the engine rotational speed NE is immediately increased, and the input torque immediately increases. Thus, it is necessary to prevent racing of the MG2 rotational speed NMG2, which is the input-side rotational speed of the automatic transmission unit 20, so the release-side hydraulic pressure is increased as compared with those at the time of engine start control (solid line) and at the time of engine stop (broken line), and the engage-side hydraulic pressure is decreased in order to prevent a lock due to a tie-up (simultaneous engagement). In addition, as the inertia phase in which the input-side rotational speed of the automatic transmission unit 20 increases, that is, the rotational speed of the power transmission member 18 (MG2 rotational speed NMG2) increases, is initiated (time t4), the release-side hydraulic pressure is gradually decreased with the increase in rotational speed to prevent racing of the input-side rotational speed (MG2 rotational speed NMG2) while immediately advancing the shift. Then, as the input-side rotational speed (MG2 rotational speed NMG2) reaches around the synchronous rotational speed of a post-shift gear (time t7), the engage-side hydraulic pressure is increased to completely engage the engage-side frictional engagement device, and the release-side hydraulic pressure is set at zero to release the release-side frictional engagement device to complete shift control.

In the case of setting in step S5 during engine start control, as indicated by the solid line in FIG. 11, only MG2 torque is applied until the engine 10 starts (starts operation), and an equal power shift at a maximum power is carried out. Thus, as the inertia phase is initiated and the MG2 rotational speed NMG2 increases, MG2 torque and, in addition, input torque decrease. On the other hand, as the engine 10 begins complete explosion to rotate by itself, input torque steeply increases. Therefore, basically, the release-side hydraulic pressure is decreased, and the engage-side hydraulic pressure is increased as compared with that during operation of the engine (alternate long and short dashed line). However, preparing for a steep increase in input torque due to a start of operation attended with engine start (start of rotation by itself), the release-side hydraulic pressure is increased as compared with that during engine stop (broken line). In addition, as the inertia phase is initiated and then the input-side rotational speed (MG2 rotational speed NMG2) increases, MG2 torque and, in addition, input torque decreases. Thus, the release-side hydraulic pressure is decreased so that the input-side rotational speed (MG2 rotational speed NMG2) increases at a predetermined rate of change. As the engine 10 begins complete explosion to rotate by itself, input torque steeply increases. Thus, in order to prevent racing of the input-side rotational speed (MG2 rotational speed NMG2), the hydraulic pressure instruction value is varied to increase the release-side hydraulic pressure by predicting the beginning of complete explosion of the engine 10. The beginning (time t6) of complete explosion of the engine 10 may be predicted on the basis of the engine rotational speed NE or an elapsed time from when start control is started (time t2). The hydraulic pressure instruction value of the release-side hydraulic pressure is increased at time t5 a predetermined period of time T1 earlier than the complete explosion predicted time in consideration of a delay of response of hydraulic pressure control. The predetermined period of time T1 may be constant or may be set using an accelerator operation amount Acc, a throttle valve opening degree θTH, an engine coolant temperature, or the like, as a parameter. After that, as the input-side rotational speed (MG2 rotational speed NMG2) reaches around the synchronous rotational speed of the post-shift gear (time t7), the engage-side hydraulic pressure is increased to completely engage the engage-side frictional engagement device, and the release-side hydraulic pressure is set at zero to release the release-side frictional engagement device, thus completing shift control. Note that, after time t2 at which control for starting the engine 10 is started, the second motor generator MG2 is maintained at a maximum power; however, the amount of torque of the reaction force at the time of an engine start indicated by the solid line is predetermined so that it can be separately added.

In the case of setting in step S6 during engine stop, only MG2 torque is applied and an equal power shift is performed in the present embodiment. Thus, as indicated by the broken lines in FIG. 11, as the inertia phase is initiated and then the input-side rotational speed (MG2 rotational speed NMG2) increases, MG2 torque and, in addition, input torque decrease. Therefore, during operation of the engine (alternate long and short dashed line), the release-side hydraulic pressure is, of course, set at a hydraulic pressure lower than that during engine start control (solid line). As the inertia phase is initiated (time t4), the release-side hydraulic pressure is decreased so that the input-side rotational speed (MG2 rotational speed NMG2) increases at a predetermined rate of change, and a hydraulic pressure value is controlled by predicting a post-shift input torque calculated on the basis of an accelerator operation amount Acc, and the like. In addition, the engage-side hydraulic pressure is set at a hydraulic pressure that is higher than that during operation of the engine (alternate long and short dashed line) and is substantially equivalent to that during engine start control (solid line). Then, as the input-side rotational speed (MG2 rotational speed NMG2) reaches around the synchronous rotational speed of the post-shift gear (time t7), the engage-side hydraulic pressure is increased to completely engage the engage-side frictional engagement device, and the release-side hydraulic pressure is set at zero to release the release-side frictional engagement device, thus completing shift control.

In this way, in the power transmission system 8 according to the present embodiment, when the automatic transmission unit 20 shifts gears, the hydraulic pressure instruction values of the hydraulic frictional engagement devices (clutch C and brake B) associated with the shift depending on the operating state of the engine 10, that is, whether the engine is stopped, in operation, or in engine start control. Then, a variation in input torque is predicted on the basis of the operating state of the engine 10 to set the hydraulic pressures. Thus, even when the changes of the operating states of the second motor generator MG2 and engine 10 overlap the shift of the automatic transmission unit 20, it is possible to constantly appropriately carry out shift control (hydraulic pressure control) of the automatic transmission unit 20 irrespective of the change of the operating state of the engine 10 and a delay of response of hydraulic pressure control. Hence, it is possible to immediately obtain a desired required driving force while suppressing shift shock.

Specifically, when control for starting the engine 10 is executed as indicated by the solid lines in FIG. 11 at the time of a downshift of the automatic transmission unit 20 during the motor drive mode in which only the second motor generator MG2 is used as the driving force source, the release-side hydraulic pressure is decreased and the engage-side hydraulic pressure is increased, as compared with those when the engine 10 is already in operation (the alternate long and short dashed lines in FIG. 11). Thus, even when a period of time until input torque increases after the engine 10 is started to operate (rotate by itself) is long, the input-side rotational speed (MG2 rotational speed NMG2) is immediately increased by the torque (MG2 torque) of the second motor generator MG2 to immediately advance the shift, and the engage-side hydraulic pressure is increased to make it possible to appropriately prevent racing of the input-side rotational speed (MG2 rotational speed NMG2) after the engine start. When the engine 10 is already in operation, input torque is immediately increased. Then, because the release-side hydraulic pressure is high, it is possible to gradually increase the input torque while suppressing racing of the input-side rotational speed (MG2 rotational speed NMG2). In addition, relatively low engage-side hydraulic pressure is increased at the time of reaching around the synchronous rotational speed of the post-shift gear to engage the engage-side frictional engagement device. Thus, it is possible to appropriately shift gears. That is, the start timing of the engine 10 and, in addition, the timing of rising of the input torque vary between when the engine 10 is already in operation and when the engine 10 is in start control, so there is a possibility that the same hydraulic pressure control may cause extension of shift time or shift shock due to racing, or the like. However, in the present embodiment, hydraulic pressure settings are changed during operation of the engine and during start control of the engine, so shift control is appropriately performed while suppressing shift shock to immediately obtain a desired required driving force.

In addition, when control for starting the engine 10 is executed (the solid lines in FIG. 11), the hydraulic pressure instruction value of the release-side hydraulic pressure is increased the predetermined period of time T1 before a time (time t6) at which a predicted increase in input torque occurs due to a start of operation of the engine 10. Therefore, irrespective of a steep increase in input torque and a delay of response of hydraulic pressure control, it is possible to appropriately prevent racing of the input-side rotational speed (MG2 rotational speed NMG2).

In addition, when control for starting the engine 10 is executed (the solid lines in FIG. 11), the release-side hydraulic pressure of the automatic transmission unit 20 is increased as compared with that when the engine 10 is not started (the broken lines in FIG. 11). Thus, it is possible to appropriately prevent racing of the input-side rotational speed (MG2 rotational speed NMG2) at the time of an increase in input torque due to a start of operation of the engine 10. When the engine 10 is not started, the torque of the second motor generator MG2 (MG2 torque) decreases because of an increase in input-side rotational speed (MG2 rotational speed NMG2) attended with the shift. However, because the release-side hydraulic pressure is low, the input-side rotational speed (MG2 rotational speed NMG2) is immediately increased by the MG2 torque, so the shift is promptly performed. In the present embodiment, equal power shift is performed, and the MG2 torque and, in addition, the input torque decrease with an increase in input-side rotational speed (MG2 rotational speed NMG2) in the inertia phase. Then, the release-side hydraulic pressure is decreased by predicting the decrease in input torque, so shift control (hydraulic pressure control) is further appropriately performed, and the shift is promptly performed.

In addition, in the present embodiment, the operating state of the engine 10 is determined when a shift instruction for shifting the automatic transmission unit 20 is output (time t3), and then hydraulic pressure instruction values are set by, for example, predicting a variation in input torque on the basis of the determined operating state of the engine 10. Thus, shift hydraulic pressures are appropriately controlled on the basis of the operating state of the engine 10 from the beginning of shift control, so it is possible to immediately shift gears while suppressing shift shock.

In addition, even when the operating state of the engine 10 is determined when a shift instruction is output and then hydraulic pressures are set in step S3, S5 or S6, and, after that, the operating state of the engine 10 varies, shift control (hydraulic pressure control) is executed in accordance with the once determined hydraulic pressure settings. Thus, in comparison with the case where hydraulic pressures settings are changed midway, occurrence of shift shock, or the like, due to a delay of response of hydraulic pressure control is prevented.

The embodiment of the invention is described in detail with reference to the accompanying drawings; however, the above embodiment is only illustrative. The aspect of the invention may be modified or improved in various forms on the basis of the knowledge of the person skilled in the art. Some of them are illustrated as follows.

For example, in the above embodiment, the operating state of the engine 10 is determined at the time when a shift instruction is output. Instead, it is also applicable that the operating state of the engine 10 is determined at the time when initiation of inertia phase is detected (time t4 in FIG. 11), and then hydraulic pressure settings are changed by, for example, predicting a variation in input torque on the basis of the determined operating state of the engine 10. In this case, for example, even when control for starting the engine 10 is started after a shift instruction is output (time t3), hydraulic pressure settings are changed on the basis of the operating state of the engine 10, and it is possible to appropriately execute shift control. From when a shift instruction is output to when inertia phase is initiated, it is only necessary that the engage-side and release-side hydraulic pressure controls are executed on the basis of the input torque, for example, as in the case of the existing art.

In addition, the second motor generator MG2 according to the present embodiment is directly coupled to the power transmission member 18. Instead, the second motor generator MG2 may be indirectly coupled to the power transmission member 18 via a transmission, or the like.

In addition, the electric differential unit 16 according to the present embodiment functions as an electric continuously variable transmission in which the speed ratio γ0 is continuously varied from a minimum value γ0min to a maximum value γ0max. Instead, for example, the aspect of the invention may also be applied to the electric differential unit 16 of which the speed ratio γ0 is not continuously varied but intentionally varied in a stepped manner using the differential function.

In addition, the electric differential unit 16 according to the present embodiment may function as a stepped transmission in such a manner that a clutch and a brake are provided to restrict differential function. For example, it is possible to configure a stepped transmission with forward two speed gears formed of a direct coupling state and an over drive (OD) state. In the direct coupling state, two rotating elements are coupled by the clutch to integrally rotate. In the OD state, the first sun gear S1 is coupled to the case 12 by the brake to increase the rotational speed of the first ring gear R1.

In addition, in the electric differential unit 16 according to the present embodiment, the first carrier CA1 is coupled to the engine 10, the first sun gear S1 is coupled to the first motor generator MG1, and the first ring gear R1 is coupled to the power transmission member 18; however, those coupling relationships are not limited. Instead, the engine 10, the first motor generator MG1 and the power transmission member 18 may be coupled to any of the three elements CA1, S1 and R1 of the first planetary gear set 24.

In addition, in the present embodiment, the engine 10 is directly coupled to the input shaft 14; however, it is sufficient that the engine 10 is, for example, operably coupled to the input shaft 14 via a gear, a belt, or the like. The engine 10 and the input shaft 14 need not be arranged along the same axis.

In addition, in the present embodiment, the first motor generator MG1 and the second motor generator MG2 are arranged coaxially with the input shaft 14, the first motor generator MG1 is coupled to the first sun gear S1, and the second motor generator MG2 is coupled to the power transmission member 18; however, they need not be arranged as described above. For example, it is also applicable that the first motor generator MG1 is operably coupled to the first sun gear S1 via a gear, a belt, a reduction gear, and the like, and the second motor generator MG2 is coupled to the power transmission member 18 via a gear, a belt, a reduction gear, or the like.

In addition, in the present embodiment, the automatic transmission unit 20 is serially coupled to the electric differential unit 16 via the power transmission member 18. Instead, it is also applicable that a counter shaft is provided parallel to the input shaft 14, and the automatic transmission unit 20 is arranged axially with the counter shaft. In this case, the electric differential unit 16 and the automatic transmission unit 20 are coupled to each other so as to allow power to be transmitted via, for example, a set of transmission members, such as a counter gear pair, a sprocket and a chain, as the power transmission member 18.

In addition, the electric differential unit 16 according to the embodiment is formed of one planetary gear set. Instead, the electric differential unit 16 may be formed of two or more planetary gear sets, and may function as three or more speed-gear transmission in a non-differential state (stepped shift state). In addition, each planetary gear set is not limited to a single pinion type. Instead, each planetary gear set may be of a double pinion type. In addition, when the electric differential unit 16 is formed of such two or more planetary gear sets as well, it is also applicable that the engine 10, the first and second motor generators MG1 and MG2, and the power transmission member 18 are coupled to the rotating elements of these planetary gear sets so that power is transmittable, and the clutches C and brakes B connected to the rotating elements are controlled to switch between stepped shift and stepless shift.

In addition, in the present embodiment, the engine 10 is directly coupled to the electric differential unit 16; however, it is not necessary that the engine 10 is directly coupled to the electric differential unit 16. It is also applicable that a clutch that connects or disconnects power transmission is interposed between the engine 10 and the electric differential unit 16.

What is claimed is:

1. A controller for a power transmission system that uses an engine and a motor as driving force sources to transmit power, the power transmission system including a transmission unit that is arranged downstream of the driving force sources and has a plurality of engagement devices, wherein the transmission unit establishes a plurality of gears having different speed ratios by the engagement devices, the controller comprising:
   a torque transmission capacity setting unit that, when the transmission unit shifts gears, varies torque transmission capacities of the respective engagement devices on the basis of an operating state of the motor and an operating state of the engine, wherein:
      when the engine is started at a time of a downshift of the transmission unit during a motor drive mode in which only the motor is used as the driving force source, the torque transmission capacity setting unit decreases a torque transmission capacity of a release-side frictional engagement device among the plurality of engagement devices of the transmission unit and increases a torque transmission capacity of an engage-side frictional engagement device among the plurality of engagement devices of the transmission unit, as compared with when the engine is already in operation.

2. The controller according to claim 1, wherein
   the torque transmission capacity setting unit outputs an instruction for increasing the torque transmission capacity of the release-side frictional engagement device at a time earlier than a time at which input torque is estimated to increase due to start of operation of the engine, by a predetermined period of time.

3. The controller according to claim 2, wherein
   when the engine is started at the time of the downshift of the transmission unit during the motor drive mode in which only the motor is used as the driving force source, the torque transmission capacity setting unit increases the torque transmission capacity of the release-side frictional engagement device of the transmission unit, as compared with when the engine is not started.

4. The controller according to claim 3, further comprising:
an engine state determination unit that determines the operating state of the engine at a time when a shift instruction for shifting the transmission unit is output or at a time when an inertia phase of a shift starts.

5. The controller according to claim 2, further comprising:
an engine state determination unit that determines the operating state of the engine at a time when a shift instruction for shifting the transmission unit is output or at a time when an inertia phase of a shift starts.

6. The controller according to claim 1, wherein
when the engine is started at the time of a downshift of the transmission unit during the motor drive mode in which only the motor is used as the driving force source, the torque transmission capacity setting unit increases the torque transmission capacity of the release-side frictional engagement device of the transmission unit, as compared with when the engine is not started.

7. The controller according to claim 1, further comprising:
an engine state determination unit that determines the operating state of the engine at a time when a shift instruction for shifting the transmission unit is output or at a time when an inertia phase of a shift starts.

8. The controller according to claim 1, wherein
when the engine is started at the time of the downshift of the transmission unit during a motor drive mode in which only the motor is used as the driving force source, the torque transmission capacity setting unit increases the torque transmission capacity of the release-side frictional engagement device of the transmission unit, as compared with when the engine is not started.

9. The controller according to claim 1, further comprising:
an engine state determination unit that determines the operating state of the engine at a time when a shift instruction for shifting the transmission unit is output or at a time when an inertia phase of a shift starts.

* * * * *